(12) United States Patent
Kondo et al.

(10) Patent No.: US 11,930,160 B2
(45) Date of Patent: Mar. 12, 2024

(54) IMAGE PROCESSING APPARATUS, IMAGE PROCESSING METHOD, AND PROGRAM

(71) Applicant: SONY CORPORATION, Tokyo (JP)

(72) Inventors: Yuhi Kondo, Tokyo (JP); Yasutaka Hirasawa, Tokyo (JP); Takefumi Nagumo, Kanagawa (JP); Toshinori Ihara, Tokyo (JP); Teppei Kurita, Tokyo (JP); Legong Sun, Tokyo (JP)

(73) Assignee: SONY CORPORATION, Tokyo (JP)

( * ) Notice: Subject to any disclaimer, the term of this patent is extended or adjusted under 35 U.S.C. 154(b) by 422 days.

(21) Appl. No.: 17/273,891

(22) PCT Filed: Jun. 6, 2019

(86) PCT No.: PCT/JP2019/022514
§ 371 (c)(1),
(2) Date: Mar. 5, 2021

(87) PCT Pub. No.: WO2020/054152
PCT Pub. Date: Mar. 19, 2020

(65) Prior Publication Data
US 2021/0243437 A1 Aug. 5, 2021

(30) Foreign Application Priority Data
Sep. 12, 2018 (JP) .................................. 2018-170378

(51) Int. Cl.
*H04N 19/105* (2014.01)
*H04N 19/136* (2014.01)
(Continued)

(52) U.S. Cl.
CPC ......... *H04N 19/105* (2014.11); *H04N 19/136* (2014.11); *H04N 19/182* (2014.11); *H04N 19/186* (2014.11); *H04N 19/423* (2014.11)

(58) Field of Classification Search
None
See application file for complete search history.

(56) References Cited

U.S. PATENT DOCUMENTS

| 2012/0169910 | A1* | 7/2012 | Singh | G02B 26/00 348/E5.091 |
| 2015/0229910 | A1 | 8/2015 | Lang | |

FOREIGN PATENT DOCUMENTS

| CN | 105814607 A | 7/2016 | |
| EP | 3086085 A1 * | 10/2016 | ............. G01B 11/24 |

(Continued)

OTHER PUBLICATIONS

Row-Interleaved Sampling for Depth-Enhanced 3D Video Coding for Polarized Displays. Homayouni et al. (Year: 2017).*

(Continued)

*Primary Examiner* — Delomia L Gilliard
(74) *Attorney, Agent, or Firm* — Paratus Law Group, PLLC

(57) ABSTRACT

A polarization imaging unit 20 acquires a polarized image including polarization pixels with a plurality of polarization directions. An information compression unit 40 sets reference image information based on polarized image information of reference polarization pixels with at least a plurality of polarization directions in the polarized image and generates difference information between the polarized image information of each of polarization pixels different from the reference polarization pixels in the polarized image and the reference image information. In addition, the information compression unit 40 reduces the amount of information of the difference information generated for each of the polarization pixels with the plurality of polarization directions to generate compressed image information including the reference image information and the difference information with the reduced amount of information. An information (Continued)

decoding unit 70 applies a decoding process corresponding to the compression process of the information compression unit 40 to the compressed image information acquired through a recording medium 50 or a transmission path 60 to generate the polarized image and outputs the polarized image to a polarized image using unit 80.

18 Claims, 30 Drawing Sheets

(51) Int. Cl.
*H04N 19/182* (2014.01)
*H04N 19/186* (2014.01)
*H04N 19/423* (2014.01)

(56) References Cited

FOREIGN PATENT DOCUMENTS

| EP | 3086085 A1 | 10/2016 | | |
|----|----|----|----|----|
| JP | 2007-086720 A | 4/2007 | | |
| JP | 2007086720 A | * 4/2007 | ......... | G06K 9/00791 |
| JP | 2015-114307 A | 6/2015 | | |
| JP | 2018-128265 A | 8/2018 | | |
| JP | 2018128265 A | * 8/2018 | ......... | H04N 19/169 |
| KR | 100704938 B1 | 4/2007 | | |
| WO | WO 2012/017600 A1 | 2/2012 | | |

OTHER PUBLICATIONS

Block-Based Illumination Compensation and Search Technique for Multiview Video Coding. Lopez et al. (Year: 2004).*
López et al., Block-based Illumination Compensation and Search Techniques for Multiview Video Coding, Proceedings of the Picture Coding Symposium, Dec. 15, 2004, pp. 1-6.
Homayouni et al., Row-Interleaved Sampling for Depth-Enhanced 3D Video Coding for Polarized Displays, ACM Transactions on Applied Perception, Mar. 27, 2017, pp. 1-23, vol. 14, No. 3, Association for Computing Machinery, Inc, New York.
Wolff et al., Constraining Object Features Using a Polarization Reflectance Model, IEEE Transactions on Pattern Analysis and Machine Intelligence, Jul. 1991, pp. 635-657, vol. 13, Issue 7, IEEE.
Atkinson et al., Recovery of Surface Orientation From Diffuse Polarization, IEEE Transactions on Image Processing, Jun. 2006, pp. 1653-1664, vol. 15, Issue 6, IEEE.

* cited by examiner

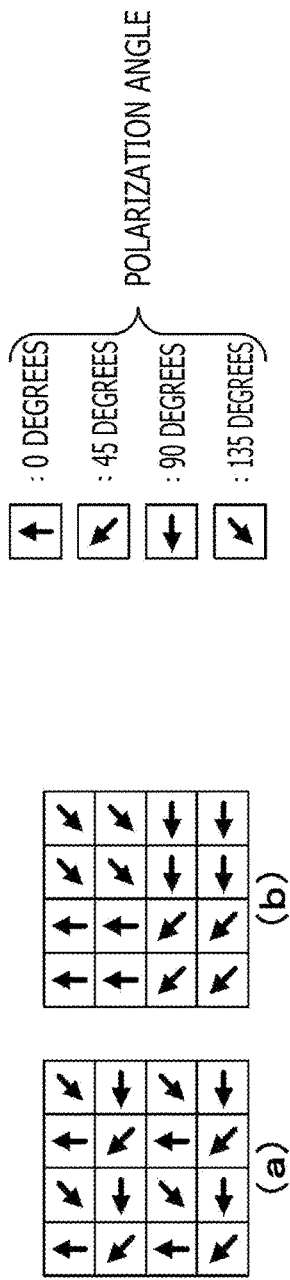
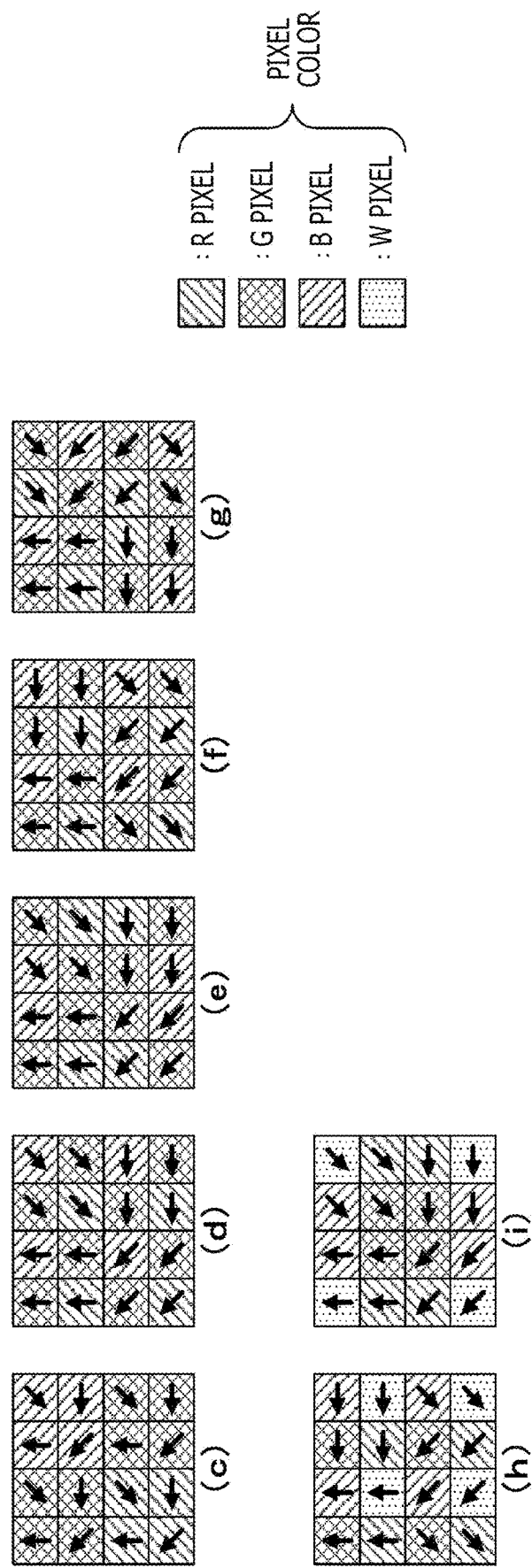
FIG. 5

F I G . 7
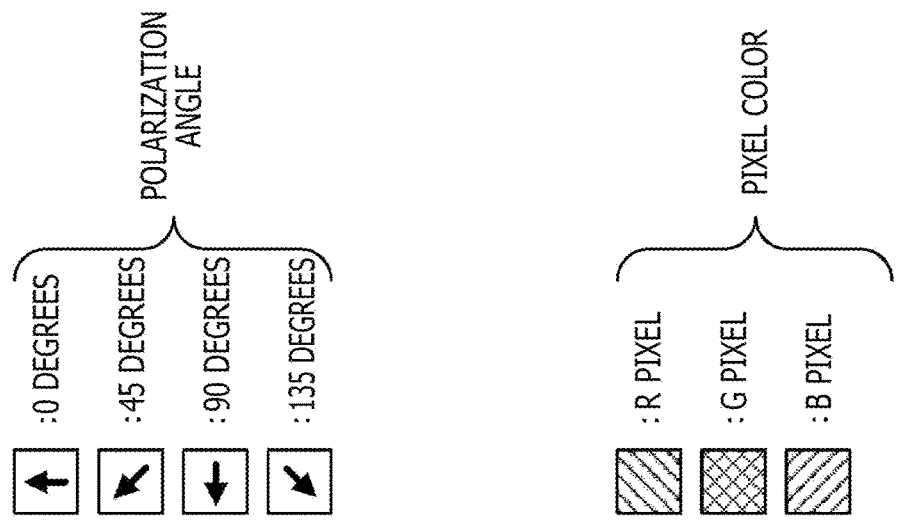
(a) 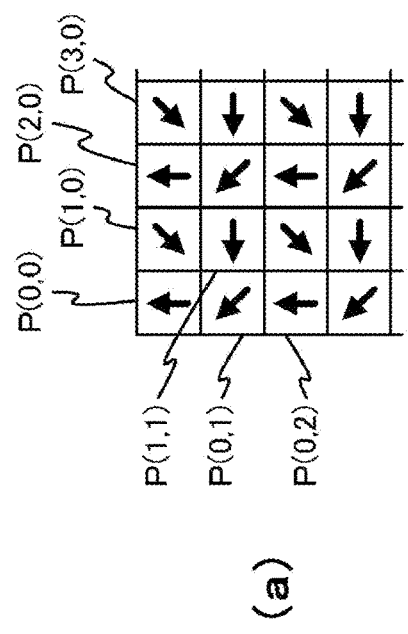
(b) 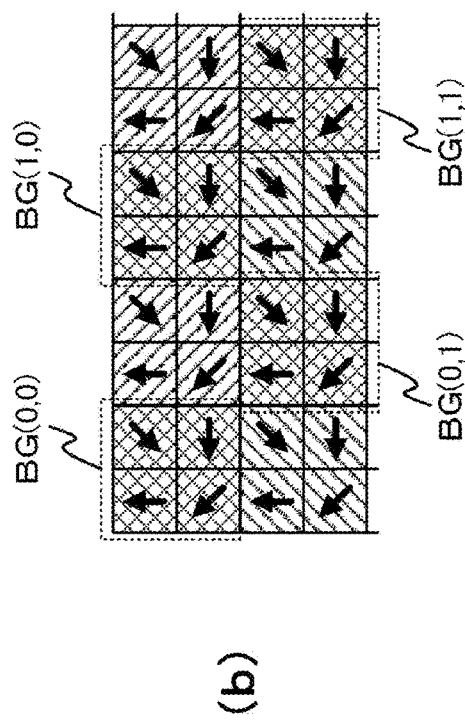

FIG.10
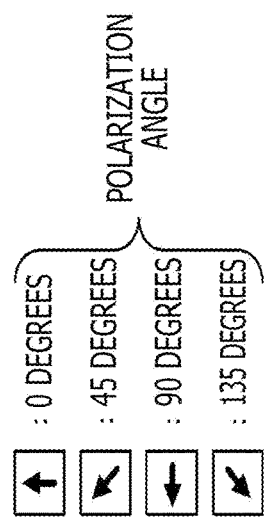
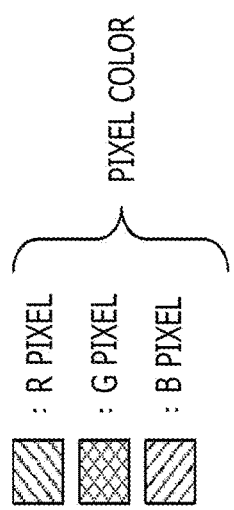
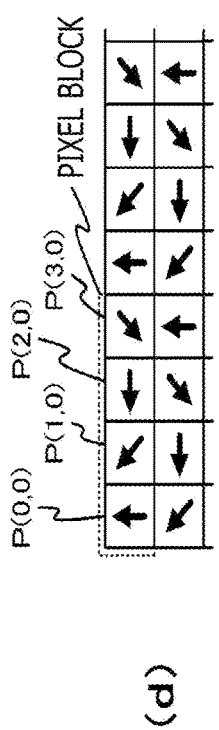
(a)
(b)
(c)
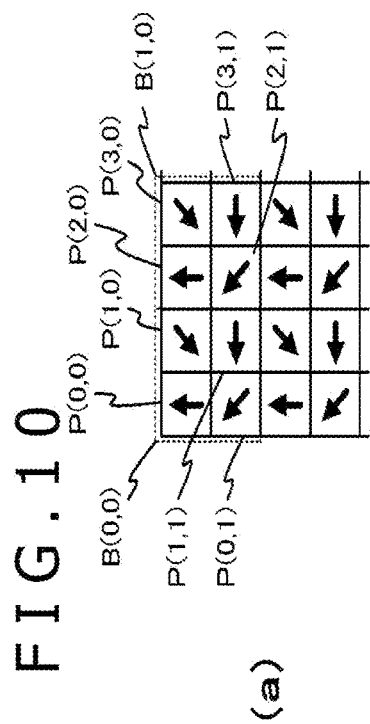
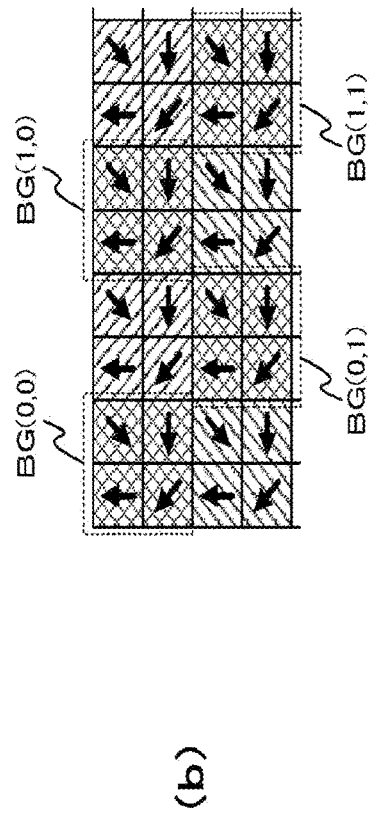
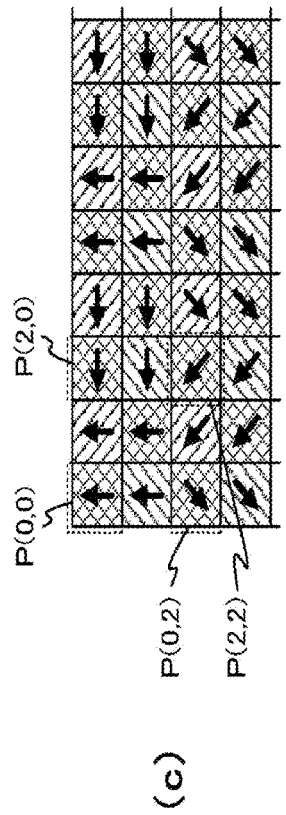

FIG. 18
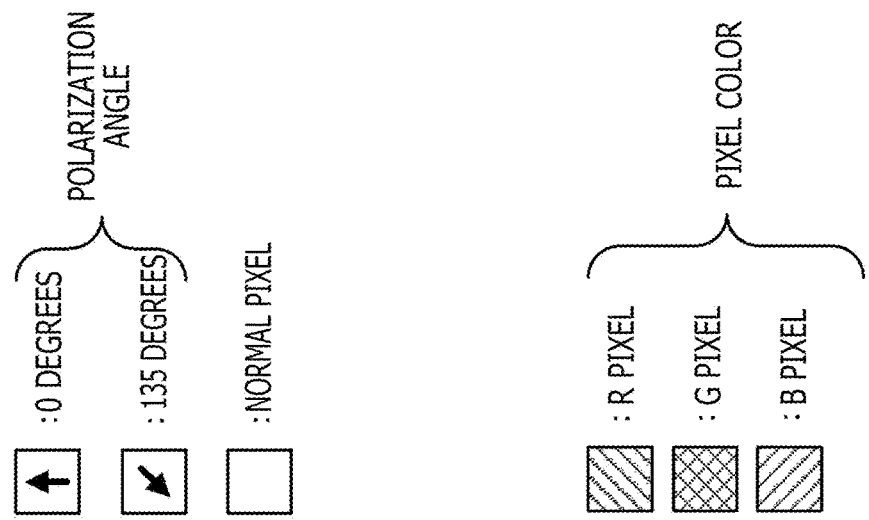
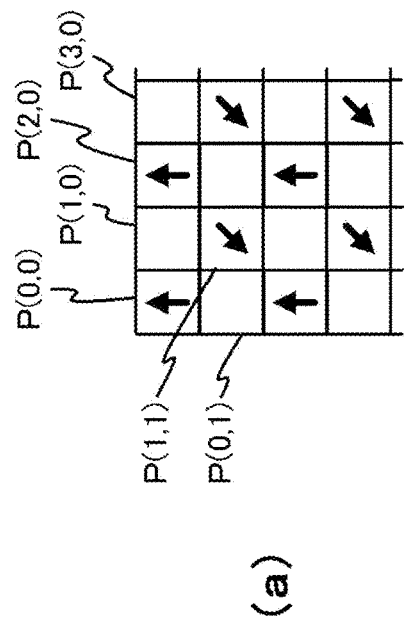
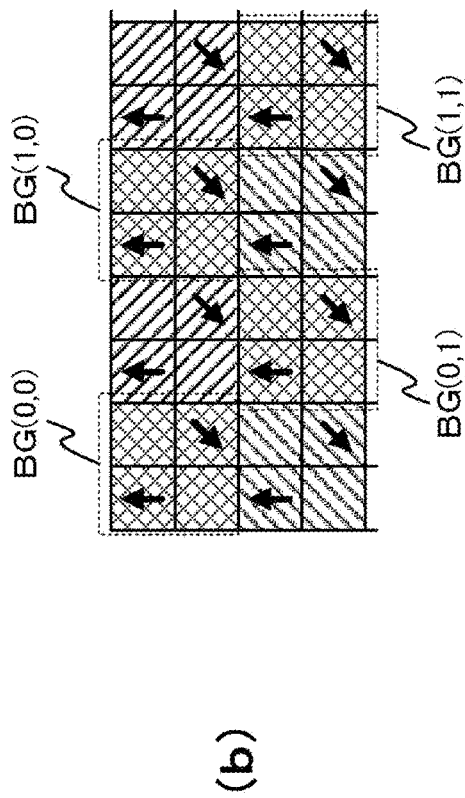

FIG. 29
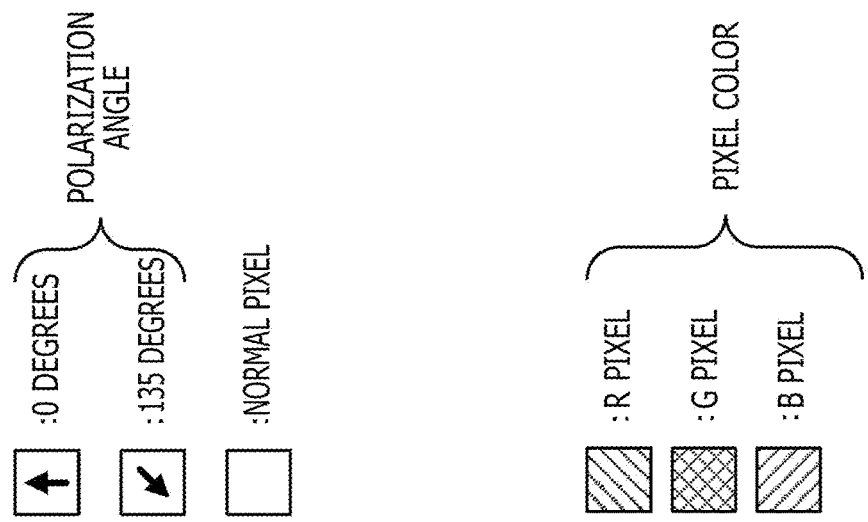
(a)
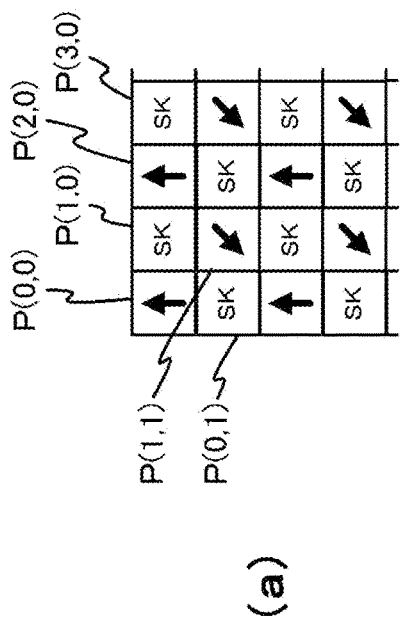
(b)
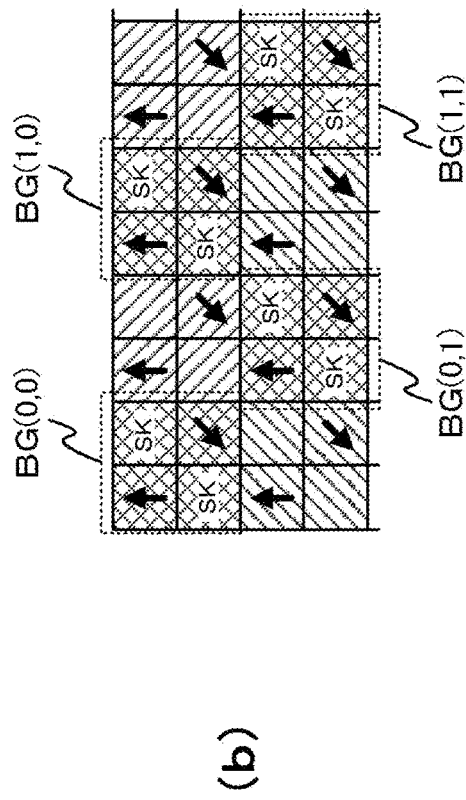

IMAGE PROCESSING APPARATUS, IMAGE PROCESSING METHOD, AND PROGRAM

CROSS REFERENCE TO PRIOR APPLICATION

This application is a National Stage Patent Application of PCT International Patent Application No. PCT/JP2019/022514 (filed on Jun. 6, 2019) under 35 U.S.C. § 371, which claims priority to Japanese Patent Application No. 2018-170378 (filed on Sep. 12, 2018), which are all hereby incorporated by reference in their entirety.

TECHNICAL FIELD

The technique relates to an image processing apparatus, an image processing method, and a program, and the technique enables to reduce an amount of information of a polarized image.

BACKGROUND ART

Conventionally, an imaging unit and a polarization filter are used to acquire a polarized image. For example, an imaging unit with a pixel configuration including pixels with different polarization directions acquires a polarized image in PTL 1.

In addition, normal information of an object is acquired from a polarized image with a plurality of polarization directions. For example, a polarized image with a plurality of polarization directions is applied to a model formula to calculate normal information in NPL 1 and NPL 2.

CITATION LIST

Patent Literature

[PTL 1]
  Japanese Patent Laid-Open No. 2015-114307

Non Patent Literature

[NPL 1]
  Lawrence B. Wolff and Terrance E. Boult: "Constraining Object Features Using a Polarization Reflectance Model," IEEE Transaction on pattern analysis and machine intelligence, Vol. 13, No. 7, July 1991
[NPL 2]
  Gary A. Atkinson and Edwin R. Hancock: "Recovery of surface orientation from diffuse polarization," IEEE Transactions of Image Processing, Vol. 15, Issue. 6, pp. 1653-1664, 2006

SUMMARY

Technical Problem

Incidentally, in an unpolarized normal image, a compression process is executed by using, for example, a correlation between adjacent pixels. However, the correlation between pixels is reduced when the polarization directions are different between adjacent pixels in a polarized image, and the amount of information cannot efficiently be reduced in a compression process similar to the compression process for the normal image.

Therefore, an object of the technique is to provide an image processing apparatus, an image processing method, and a program that can execute a compression process and a decoding process suitable for a polarized image.

Solution to Problem

A first aspect of the technique provides an image processing apparatus including:
an information compression unit that generates compressed image information by reducing an amount of information of polarized image information of each of polarization pixels with at least a plurality of polarization directions in a polarized image including polarization pixels with a plurality of polarization directions.

In the technique, the information compression unit sets reference image information based on polarized image information of reference polarization pixels with at least a plurality of polarization directions in the polarized image including the polarization pixels with the plurality of polarization directions and generates difference information between polarized image information of each of polarization pixels different from the reference polarization pixels in the polarized image and the reference image information. In addition, the information compression unit reduces an amount of information of the difference information generated for each of the polarization pixels with the plurality of polarization directions to generate the compressed image information including the reference image information and the difference information with the reduced amount of information. For example, the information compression unit sets a bit width of the difference information to a width smaller than a bit width of the reference image information to reduce the amount of information of the difference information.

The reference image information generated by the information compression unit includes information indicating an intensity value of the reference polarization pixel of each color and each polarization direction, and the difference information includes information indicating a difference between the intensity value of the reference polarization pixel and an intensity value of a polarization pixel of the same color and the same polarization direction different from the reference polarization pixel.

In addition, the information compression unit generates the reference image information and the difference information based on a nature of polarization. For example, the reference image information generated by the information compression unit the reference image information may include information indicating a reference average intensity value calculated for each color by using intensity values of reference polarization pixels with a plurality of polarization directions and may include information indicating a reference intensity value that is an intensity value of the reference polarization pixel with a polarization direction designated in advance from combinations of polarization pixels with polarization directions that allow to calculate an average intensity value, and the difference information may include information indicating a difference between an average intensity value, which is calculated for each color by using intensity values of polarization pixels different from the reference polarization pixels, and the reference average intensity value of the same color and may include information indicating a difference between the intensity value of the polarization pixel different from the reference polarization pixel and the reference intensity value of the same color and the same polarization direction.

In addition, the reference image information generated by the information compression unit may include information indicating a reference average intensity value calculated for each color by using intensity values of reference polarization pixels with a plurality of polarization directions, and the difference information may include information indicating a difference between an average intensity value, which is calculated for each color by using intensity values of polarization pixels with a plurality of polarization directions different from the reference polarization pixels, and the reference average intensity value of the same color and may include information indicating a difference between a ratio of an intensity value in a pixel block of the polarization pixels different from the reference polarization pixels and a ratio of an intensity value of polarization pixels in an adjacent pixel block.

In addition, the reference image information generated by the information compression unit may include information indicating a reference average intensity value calculated for each color by using intensity values of reference polarization pixels with a plurality of polarization directions, and the difference information may include information indicating a difference between an average intensity value, which is calculated for each color by using intensity values of polarization pixels with a plurality of polarization directions different from the reference polarization pixels, and the reference average intensity value of the same color and may include information indicating a difference between each of the intensity values of the polarization pixels with the plurality of polarization directions different from the reference polarization pixels and a predicted value of the same polarization direction. In this case, the predicted value is calculated for each polarization direction based on the average intensity value calculated in a pixel block of the polarization pixels different from the reference polarization pixels and based on a ratio of an intensity value of each polarization pixel in a pixel block adjacent to the pixel block.

Furthermore, in a case where the polarized image includes an unpolarized normal pixel, the reference image information generated by the information compression unit may include information indicating an unpolarized reference intensity value that is an intensity value of a reference normal pixel of each color and may include information indicating a polarized reference intensity value that is an intensity value of a reference polarization pixel with a polarization direction designated in advance from combinations of polarization pixels with polarization directions that allow to calculate an average intensity value, and the difference information may include information indicating a difference between an intensity value of a normal pixel different from the reference normal pixel and an unpolarized reference intensity value of the same color and may include information indicating a difference between an intensity value of a polarization pixel with the same polarization direction that is a polarization pixel different from the reference polarization pixel and a polarized reference intensity value with the same polarization direction.

Furthermore, in a case where the polarized image includes an unpolarized normal pixel, the reference image information generated by the information compression unit may include information indicating an unpolarized reference intensity value that is an intensity value of a reference normal pixel of each color, and the difference information may include information indicating a difference between an intensity value of a normal pixel different from the reference normal pixel and an unpolarized reference intensity value of the same color and may include information indicating a difference between a ratio of an intensity value of a designated polarization pixel in a pixel block, which includes the designated polarization pixel with a polarization direction designated in advance from combinations of normal pixels different from the reference normal pixels and polarization pixels with polarization directions that allow to calculate an average intensity value, and a ratio of an intensity value of the designated polarization pixel in an adjacent pixel block.

Furthermore, in the case where the polarized image includes an unpolarized normal pixel, the reference image information generated by the information compression unit may include information indicating an unpolarized reference intensity value that is an intensity value of a reference normal pixel of each color, and the difference information may include information indicating a difference between an intensity value of a normal pixel different from the reference normal pixel and an unpolarized reference intensity value of the same color and may include information indicating a difference between an intensity value of a designated polarization pixel in a pixel block, which includes the designated polarization pixel with a polarization direction designated in advance from combinations of normal pixels different from the reference normal pixels and polarization pixels with polarization directions that allow to calculate an average intensity value, and a predicted value of the same polarization direction. In this case, the predicted value is calculated for each polarization direction based on a ratio of the intensity value of the normal pixel different from the reference normal pixel and an intensity value of the designated polarization pixel in a pixel block adjacent to the pixel block.

In addition, the image processing apparatus may further include a characteristic information storage unit that stores characteristic information regarding acquisition of the polarized image including the polarization pixels with the plurality of polarization directions, in which the information compression unit may use the characteristic information stored in the characteristic information storage unit to generate the compressed image information.

In a case where the characteristic information indicates an extinction ratio or a transmission axis transmittance of a polarization imaging unit that has acquired the polarized image, the information compression unit uses the extinction ratio or the transmission axis transmittance to correct the polarized image and uses the polarized image after the correction to generate the compressed image information.

Furthermore, in a case where the characteristic information indicates a polarization direction of polarization illumination light used to acquire the polarized image, the information compression unit generates the reference image information and the difference information based on the polarization direction of the polarization illumination light.

A second aspect of the technique provides an image processing method including:

by an information compression unit, generating compressed image information by reducing an amount of information of polarized image information of each of polarization pixels with at least a plurality of polarization directions in a polarized image including polarization pixels with a plurality of polarization directions.

A third aspect of the technique provides a program causing a computer to execute a compression process of a polarized image, the program causing the computer to execute:

a procedure of acquiring the polarized image including polarization pixels with a plurality of polarization directions; and a procedure of generating compressed image information by reducing an amount of information of polarized image information of each of polarization pixels with at least a plurality of polarization directions in the polarized image.

Note that the program of the present technique is a program that can be provided to, for example, a general-purpose computer, which can execute various program codes, through a storage medium or a communication medium provided in a computer-readable format, that is, for example, a storage medium such as an optical disk, a magnetic disk, and a semiconductor memory or a communication medium such as a network. By providing the program in the computer-readable format, the process corresponding to the program is realized on the computer.

A fourth aspect of the technique provides
an image processing apparatus including:
an information decoding unit that generates a polarized image by executing a decoding process of compressed image information generated by an information compression unit reducing an amount of information of polarized image information of each of polarization pixels with at least a plurality of polarization directions in the polarized image including polarization pixels with a plurality of polarization directions.

BRIEF DESCRIPTION OF DRAWINGS

FIG. 5 is a diagram illustrating polarization filters and color filters of an image sensor.

FIG. 7 is a diagram for describing the first operation of the information compression unit according to the first configuration.

FIG. 10 is a diagram for describing the second operation of the information compression unit according to the first configuration.

FIG. 18 is a diagram for describing the fifth operation of the information compression unit according to the first configuration.

FIG. 29 is a diagram for describing the second operation of the information compression unit according to the second configuration.

DESCRIPTION OF EMBODIMENT

Hereinafter, an embodiment of the present technique will be described. Note that the embodiment will be described in the following order.
1. Acquisition of Polarized Image
2. First Configuration of Polarized Image Processing System
3. Compression Process and Decoding Process According to First Configuration
  3-1. First Operation of Information Compression Unit and Information Decoding Unit According to First Configuration
  3-2. Second Operation of Information Compression Unit and Information Decoding Unit According to First Configuration
  3-3. Third Operation of Information Compression Unit and Information Decoding Unit According to First Configuration
  3-4. Fourth Operation of Information Compression Unit and Information Decoding Unit According to First Configuration 3-5. Fifth Operation of Information Compression Unit and Information Decoding Unit According to First Configuration 3-6. Sixth Operation of Information Compression Unit and Information Decoding Unit According to First Configuration 3-7. Seventh Operation of Information Compression Unit and Information Decoding Unit According to First Configuration 4. Second Configuration of Polarized Image Processing System 5. Compression Process and Decoding Process According to Second Configuration 5-1. First Operation of Information Compression Unit According to Second Configuration 5-2. Second Operation of Information Compression Unit According to Second Configuration 6. Another Operation of Compression Process 7. Application Examples <1. Acquisition of Polarized Image>

Figure 1:
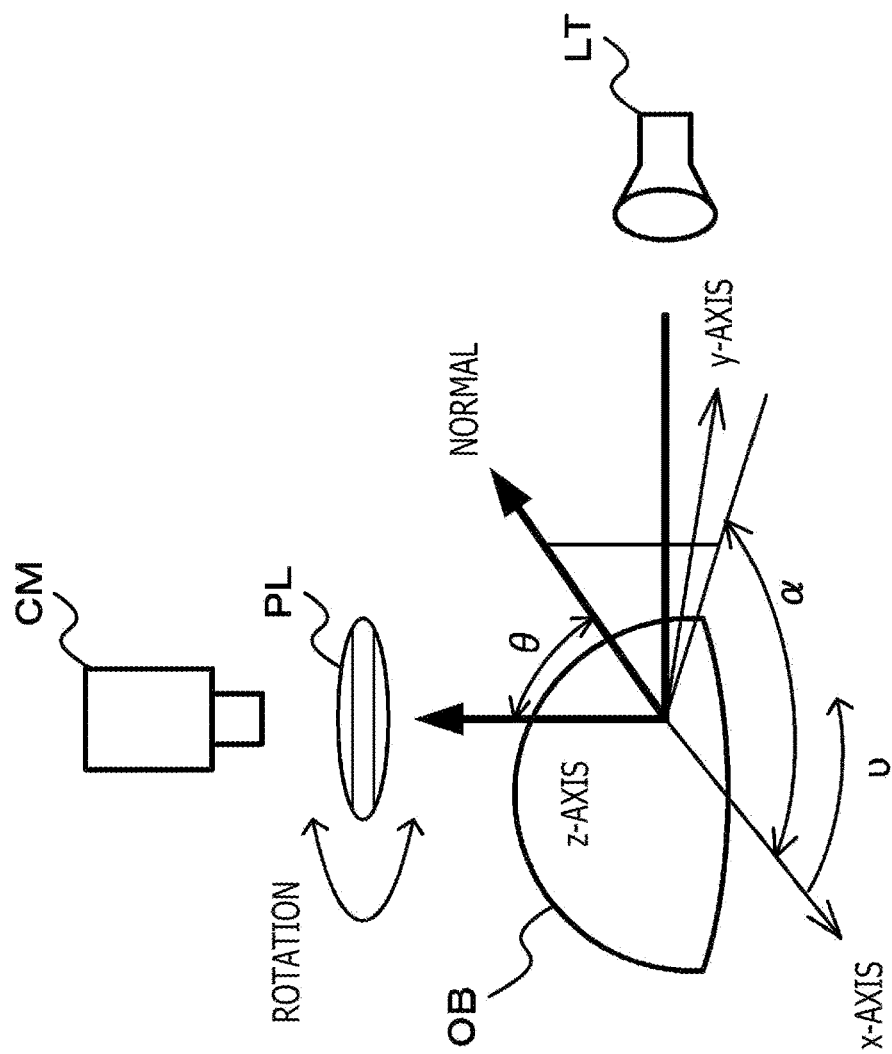
FIG. 1 is a diagram for describing acquisition of a polarized image.
Figure 2:
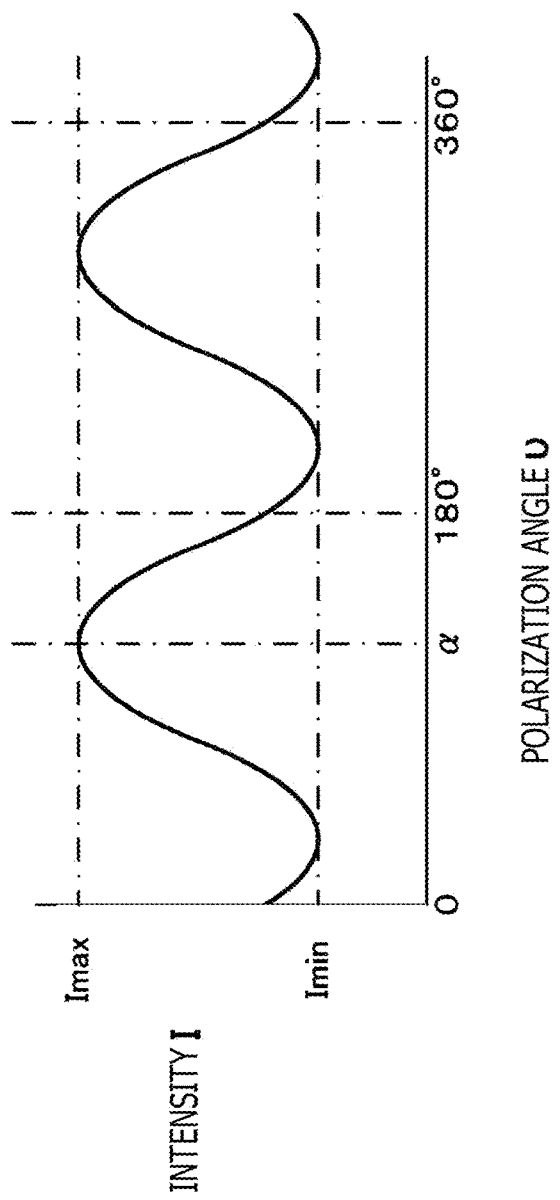
FIG. 2 is a diagram illustrating a relation between intensity and polarization angle.

FIG. 1 is a diagram for describing acquisition of a polarized image. For example, as illustrated in FIG. 1, a light source LT is used to light an object OB, and an imaging unit CM images the object OB through a polarizer PL. In this case, an intensity of the object OB in the captured image varies according to a polarization direction of the polarizer PL. Note that, to facilitate the understanding, the highest intensity when, for example, the polarization direction is rotated will be defined as Imax, and the lowest intensity will be defined as Imin. In addition, assuming that an x-axis and a y-axis in two-dimensional coordinates are on a plane of the polarizer, an angle of the y-axis direction with respect to the x-axis when the polarization direction of the polarizer is rotated will be defined as a polarization angle upol. The polarization direction of the polarizer returns to an original polarization state when the polarization direction is rotated 180 degrees around a z-axis direction, and the polarization direction has a period of 180 degrees. Furthermore, an intensity I observed when the polarization direction is rotated can be represented as in Equation (1). Note that FIG. 2 illustrates a relation between the intensity and the polarization angle.

[Math. 1]

$$I = \frac{I_{max} + I_{min}}{2} + \frac{I_{max} - I_{min}}{2}\cos(2v_{pol} - 2\phi) \quad (1)$$

In Equation (1), the polarization angle upol is apparent at generation of the polarized image, and the maximum intensity Imax, the minimum intensity Imin, and an azimuth angle φ are variables. Therefore, the intensity of a polarized image with three or more polarization directions can be used and fitted to the polarization model formula illustrated in Equation (1) to estimate the intensity of a desirable azimuth angle φ based on the polarization model formula indicating the relation between the intensity and the polarization angle.

In addition, the relation of Equation (2) is established between an average intensity value Imean and the intensity value in each polarization direction, where "I0" represents the intensity value when the polarization direction is 0 degrees, "I45" represents the intensity value when the polarization direction is 45 degrees, "I90" represents the intensity value when the polarization direction is 90 degrees, and "I135" represents the intensity value when the polarization direction is 135 degrees.

[Math. 2]

$$I_{mean} = \frac{I_0 + I_{90}}{2} = \frac{I_{45} + I_{135}}{2} = \frac{I_0 + I_{45} + I_{90} + I_{135}}{4} \quad (2)$$

<2. First Configuration of Polarized Image Processing System>

Figure 3:
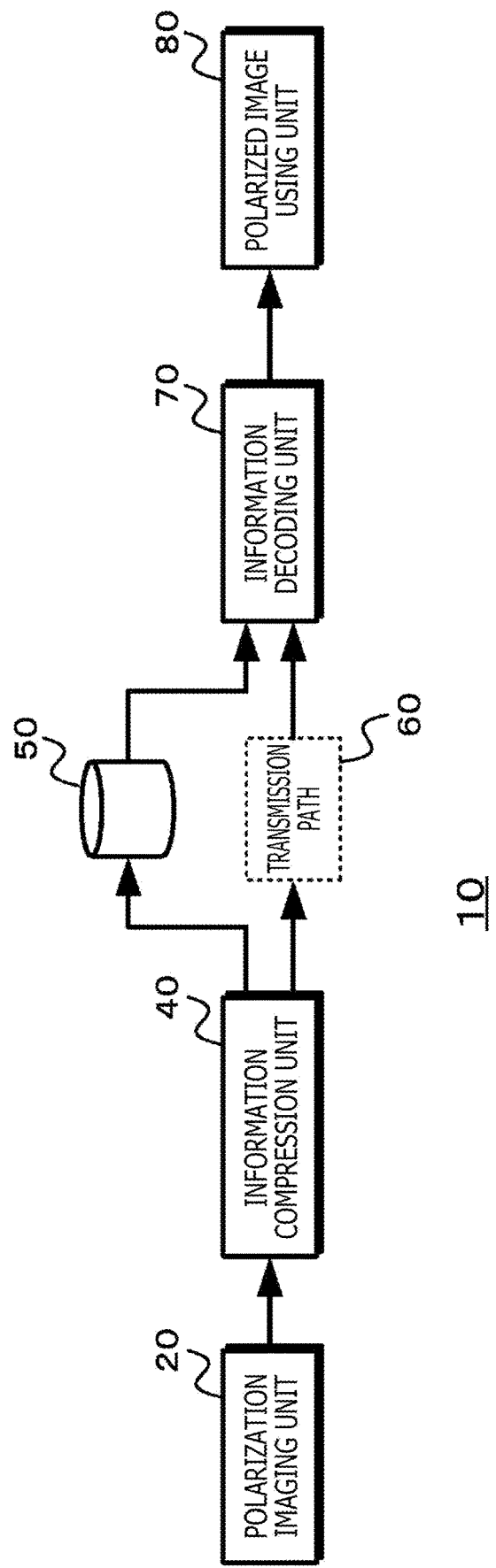
FIG. 3 is a diagram illustrating a first configuration of a polarized image processing system.

FIG. 3 illustrates a first configuration of a polarized image processing system using an image processing apparatus of the present technique. A polarized image processing system 10 includes a polarization imaging unit 20 and an information compression unit 40. In addition, an information decoding unit 70 and a polarization information using unit 80 may be provided on the polarized image processing system 10. The polarized image processing system 10 supplies compressed polarization information generated by the information compression unit 40 to the information decoding unit 70 through a recording medium 50 or a transmission path 60.

Figure 4:
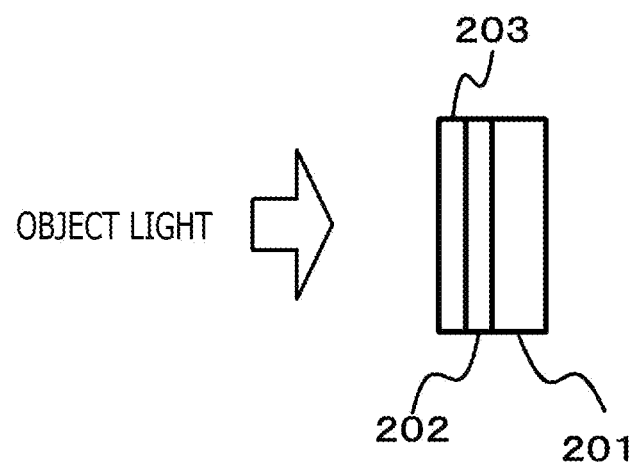
FIG. 4 is a diagram illustrating a configuration of a polarization imaging unit.

The polarization imaging unit 20 acquires a plurality of polarized images with different polarization directions. FIG. 4 illustrates a configuration of the polarization imaging unit. A polarization filter 202 with a pixel configuration of a plurality of polarization directions is arranged on an incident light surface of an image sensor 201 in the polarization imaging unit 20, and the image sensor 201 acquires the polarized image. In addition, the polarization filter 202 and a color filter 203 with a pixel configuration for each color component are arranged on the incident light surface of the image sensor 201, and the image sensor 201 may acquire a color polarized image.

FIG. 5 illustrates polarization filters and color filters of the image sensor. In FIG. 5, (a) and (b) illustrate polarization patterns of the polarization filter. It is only necessary that the polarization filter can extract linearly polarized light from object light, and for example, a wire grid, a photonic crystal, or the like is used. In FIG. 5, (a) illustrates a case in which one pixel is a unit of polarization components, and for example, pixels with a plurality of polarization directions (for example, four directions including 0 degrees, 45 degrees, 90 degrees, and 135 degrees) are provided to allow fitting into the polarization model formula indicated in Equation (1). In addition, (b) of FIG. 5 illustrates a case in which a unit of 2×2 pixels is a unit of polarization components. Note that the polarization patterns of the polarization filter are not limited to the arrangements illustrated in (a) of FIG. 5 or (b) of FIG. 5, and unpolarized pixels may be set as a unit of polarization components.

In FIG. 5, (c) to (g) illustrate combinations of color filters and polarization filters. In FIG. 5, (c) illustrates a case of using the polarization filter illustrated in (a) of FIG. 5 and a color filter with a Bayer array including, for example, color components of red, blue, and green (RGB) in which a unit of color components is 2×2 pixels. In addition, (d) of FIG. 5 illustrates a case of using the polarization filter illustrated in (b) of FIG. 5 and a color filter with a Bayer array including, for example, color components of red, blue, and green (RGB) in which the unit of color components is 1×1 pixel. In FIG. 5, (e) illustrates a case of using the polarization filter illustrated in (b) of FIG. 5 and a color filter with a Bayer array including, for example, color components of red, blue, and green (RGB) in which the unit of color components is 1×1 pixel, and a pixel area of 2×2 pixels includes pixels of the same color with four polarization directions. In FIG. 5, (e) illustrates a case of using the polarization filter illustrated in (b) of FIG. 5 and a color filter with a Bayer array including, for example, color components of red, blue, and green (RGB) in which the unit of color components is 1×1 pixel, and a pixel area of 2×2 pixels includes pixels of the same color with four polarization directions. In (f) of FIG. 5, a unit of 2×2 pixels is the unit of polarization components, and the polarization directions of the unit of polarization components in a horizontal direction have an angular difference of 90 degrees. The polarization directions of the unit of polarization components in a vertical direction have an angular difference of 45 degrees and have a position difference corresponding to one pixel in the horizontal direction. In (g) of FIG. 5, a unit of 2×2 pixels is the unit of polarization components, and the polarization directions of the unit of polarization components in the vertical direction have an angular difference of 90 degrees. The polarization directions of the unit of polarization components in the horizontal direction have an angular difference of 45 degrees and have a position difference corresponding to one pixel in the vertical direction.

In FIG. 5, (h) and (i) illustrate cases in which white pixels (W pixels) are provided. In FIG. 5, (h) illustrates a case in which the unit of polarization components is a unit of 2×2 pixels, and one unit of polarization components includes red, blue, green, and white pixels. In addition, (i) of FIG. 5 illustrates a case in which the unit of polarization components is a unit of 2×2 pixels, one unit of polarization components includes red, blue, green, and white pixels, and an area of 2×2 pixels where the units of polarization components are adjacent to each other includes pixels with four polarization directions. In addition, although not illustrated, a combination of a polarization filter, which includes unpolarized pixels in the unit of polarization components, and a color filter may also be used.

The fitting to the polarization model formula indicated in Equation (1) is not limited to the case of using the polarized image with three or more polarization directions, such as a polarized image with four different polarization directions, and an unpolarized image and a polarized image with two polarization directions may also be used. Sensitivity of the polarization pixel is ideally (½) times sensitivity of an unpolarized normal pixel, and the average intensity value of the polarization pixels is ½ times an intensity value Inp of the normal pixel. Furthermore, in a case where the polarization directions are four directions at 45 degree intervals, Equation (6) is established, where, for example, the polarization directions are 0 degrees, 45 degrees, 90 degrees, and 135 degrees, as illustrated in FIG. 2. Here, in a case where the pixels of the polarization imaging unit 20 include normal pixels, polarization pixels with the polarization direction of 0 degrees, and polarization pixels with the polarization direction of 45 degrees, the intensity value I90 with the polarization direction of 90 degrees and the intensity value I135 with the polarization direction of 135 degrees can be calculated based on Equations (7) and (8).

$$(I45+I135)/2=(I0+I90)/2=Inp/2 \quad (6)$$

$$I90=Inp-I0 \quad (7)$$

$$I135=Inp-I45 \quad (8)$$

The information compression unit 40 executes a compression process of a polarized image including pixels with a plurality of polarization directions acquired by the polarization imaging unit 20. The information compression unit 40 generates compressed image information by reducing the amount of information of the polarized image information of each of selected polarization pixels with at least a plurality of polarization directions in the acquired polarized image.

The information compression unit 40 outputs the generated compressed image information to the information decoding unit 70 through the recording medium 50 or the transmission path 60. Note that details of the operation of the information compression unit 40 will be described later.

The information decoding unit 70 executes a decoding process corresponding to the compression process of the information compression unit 40 and generates the polarized image before the compression process from the compressed image information acquired through the recording medium 50 or the transmission path 60. The information decoding unit 70 outputs the generated polarized image to the polarization information using unit 80.

The polarization information using unit 80 performs detection of a normal direction of the object, detection of reflection components, and the like based on the polarized image generated by the information decoding unit 70 and performs generation of a highly accurate depth map, an object recognition process, removal of specular reflection components, generation of a VR (Virtual Reality) environment, and the like.

<3. Compression Process and Decoding Process According to First Configuration>

Next, the compression process executed by the information compression unit and the decoding process executed by the information decoding unit will be described. The information compression unit sets reference image information based on polarized image information of reference polarization pixels in a polarized image, generates difference information indicating a difference between the polarized image information of each of selected polarization pixels different from the reference polarization pixels in the polarized image and the reference image information, reduces the amount of information of the difference information generated for each of the polarization pixels, and generates compressed image information including the reference image information and the difference information with the reduced amount of information. In addition, the information decoding unit executes a decoding process corresponding to the compression process of the information compression unit based on the reference image information and the difference information of the compressed image information generated by the information compression unit and generates an intensity value of each pixel of the polarized image. Note that the processes executed by the information compression unit 40 and the information decoding unit 70 may be either lossless compression or lossy compression.

<3-1. First Operation of Information Compression Unit and Information Decoding Unit According to First Configuration>

In a first operation of the information compression unit and the information decoding unit, reference image information including information of an intensity value of a reference polarization pixel of each color and each polarization direction and difference information including information indicating a difference between the intensity value of the reference polarization pixel and an intensity value of a polarization pixel of the same color and the same polarization direction different from the reference polarization pixel are generated, and the amount of information of the difference information generated for each polarization pixel is reduced.

Figure 6:
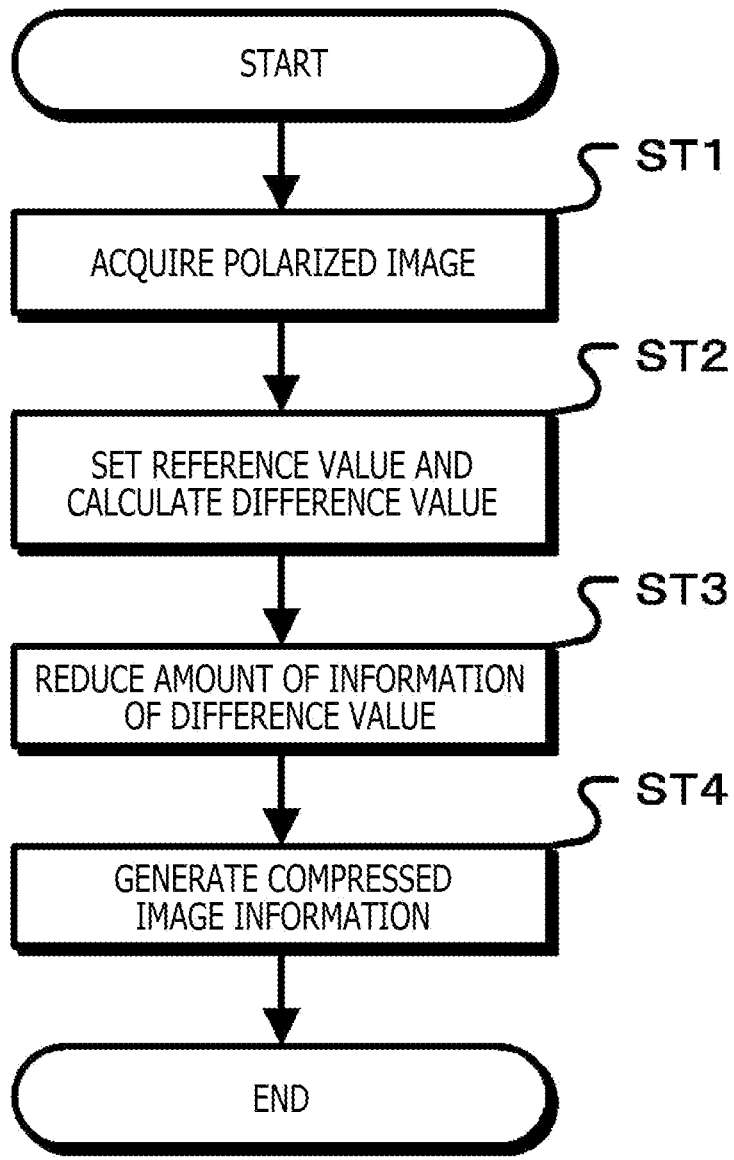
FIG. 6 is a flow chart illustrating a first operation of an information compression unit according to the first configuration.

FIG. 6 is a flow chart illustrating the first operation of the information compression unit according to the first configuration. In step ST1, the information compression unit acquires the polarized image. The information compression unit 40 acquires the polarized image generated by the polarization imaging unit 20 and proceeds to step ST2.

In step ST2, the information compression unit sets the reference value and calculates the difference value. The information compression unit 40 sets the reference polarization pixel for each pixel of the same color and the same polarization in the polarized image and sets the intensity value of the reference polarization pixel as a reference intensity value. In addition, the information compression unit 40 calculates the difference value between the intensity value of each of the polarization pixels later in the order of pixel than the reference polarization pixels and the reference intensity value of the same color and the same polarization. For example, the information compression unit 40 sets the first pixel of each of different colors and different polarization directions as a reference polarization pixel to set the reference intensity value. In addition, the information compression unit 40 calculates the difference value between the intensity value of a later polarization pixel and the reference intensity value of the same color and the same polarization and proceeds to step ST3.

In step ST3, the information compression unit reduces the amount of information of the difference value. The information compression unit 40 sets a bit width of the difference value to a width smaller than a bit width of the reference value and proceeds to step ST4.

In step ST4, the information compression unit generates the compressed image information. The information compression unit 40 sets the reference value set in step ST2 as reference image information and sets the difference value with the amount of information reduced in step ST3 as difference information to generate the compressed image information including the reference image information and the difference information.

FIG. 7 is a diagram for describing the first operation of the information compression unit according to the first configuration. Note that (a) of FIG. 7 illustrates a case in which the polarized image acquired by the polarization imaging unit is a black and white polarized image, and (b) of FIG. 7 illustrates a case in which the polarized image acquired by the polarization imaging unit is a color polarized image.

In (a) of FIG. 7, a polarization pixel P(0,0) is the first pixel with the polarization direction of 0 degrees, and the information compression unit 40 sets the polarization pixel P(0,0) as a reference polarization pixel and sets the intensity value as a reference intensity value. Next, a polarization pixel P(1,0) is the first pixel with the polarization direction of 135 degrees, and the information compression unit 40 sets the polarization pixel P(1,0) as a reference polarization pixel and sets the intensity value as a reference intensity value. A polarization pixel P(2,0) is the second pixel with the polarization direction of 0 degrees, and the information compression unit 40 calculates the difference value between the intensity value of the polarization pixel P(2,0) and the reference intensity value of the same polarization. In addition, a polarization pixel P(3,0) is the second pixel with the polarization direction of 135 degrees, and the information compression unit 40 calculates the difference value between the intensity value of the polarization pixel P(3,0) and the reference intensity value of the same polarization. Similarly, for each pixel of the first line, the information compression unit 40 sets the intensity value of the reference polarization pixel as a reference intensity value and calculates the difference value between the intensity value of the polarization pixel different from the reference polarization pixel and the reference intensity value of the same polarization.

Next, a polarization pixel P(0,1) is the first pixel with the polarization direction of 45 degrees, and the information compression unit 40 sets the polarization pixel P(0,1) as a reference polarization pixel and sets the intensity value as a reference intensity value. Next, a polarization pixel P(1,1) is the first pixel with the polarization direction of 90 degrees, and the information compression unit 40 sets the polarization pixel P(1,1) as a reference polarization pixel and sets the intensity value as a reference intensity value. For each of the later polarization pixels in the horizontal direction, the information compression unit 40 calculates the difference value between the intensity value of the polarization pixel and the reference intensity value of the same polarization.

In addition, a polarization pixel P(0,2) is a polarization pixel with the polarization direction of 0 degrees, and the reference intensity value is set for the polarization direction of 0 degrees. Therefore, the information compression unit 40 calculates the difference value between the intensity value of the polarization pixel P(0,2) and the reference intensity value of the same polarization. Similarly, the information compression unit 40 calculates the difference values, and in a case where the reference intensity value as an intensity value of the reference polarization pixel with each of four polarization directions has m bits, the information compression unit 40 reduces the bit width of the difference value calculated for each of the other polarization pixels to n bits (n<m bits) to reduce the amount of information of the difference information. Therefore, the amount of information (amount of data) of the compressed image information including the reference image information and the difference information can be smaller than the amount of information of the polarized image.

Furthermore, in the case of (b) in FIG. 7, the process described with reference to (a) of FIG. 7 is performed for each color. For example, the information compression unit 40 sets, as a reference polarization pixel, each polarization pixel of a green pixel block BG(0,0) of 2×2 pixels with different polarization directions and sets the intensity value as a reference intensity value. In addition, for each of green pixel blocks BG(1,0), BG(1,0), BG(0,1), and BG(1,1), the information compression unit 40 calculates the difference value between the intensity value of the polarization pixel and the reference intensity value of the same polarization. Similarly, the information compression unit 40 sets the reference value and calculates the difference value for each of the green polarization pixels, the red polarization pixels, and the blue polarization pixels. Furthermore, in the case where the reference intensity value as an intensity value of the reference polarization pixel with each of four polarization directions has m bits, the information compression unit 40 reduces the bit width of the difference value calculated for each of the other polarization pixels to n bits (n<m bits) to reduce the amount of information of the difference information. Therefore, the amount of information (amount of data) of the compressed image information including the reference image information and the difference information can be smaller than the amount of information of the color polarized image.

Figure 8:
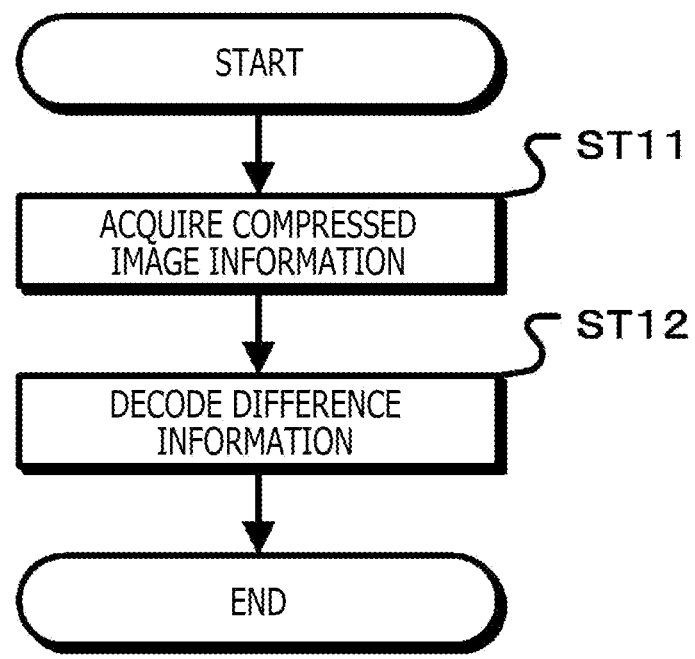
FIG. 8 is a flow chart illustrating the first operation of an information decoding unit according to the first configuration.

FIG. 8 is a flow chart illustrating the first operation of the information decoding unit according to the first configuration. In step ST11, the information decoding unit acquires the compressed image information. The information decoding unit 70 acquires the compressed image information generated by the information compression unit 40 through the recording medium 50 or the transmission path 60 and proceeds to step ST12.

In step ST12, the information decoding unit decodes the difference information. The information decoding unit 70 adds the difference value indicated in the difference information and the reference intensity value of the same color and the same polarization as the difference value to decode the intensity value of the polarization pixel.

According to the first operation as described above, the amount of information of the polarized image can efficiently be reduced. In addition, since the amount of information (amount of data) can be reduced, the polarized image can efficiently be delivered.

<3-2. Second Operation of Information Compression Unit and Information Decoding Unit According to First Configuration>

In a second operation of the information compression unit, a compression process based on the nature of polarization indicated in Equation (2) above is executed. That is, among average intensity values and combinations of two polarization directions that allow to calculate the average intensity values (for example, a set of 0 degrees and 90 degrees and a set of 45 degrees and 135 degrees), the information compression unit can use intensity values and an average intensity value of polarization pixels of polarization pixels with the polarization directions designated in advance (designated polarization pixels), such as designated polarization pixels with the polarization directions of 0 degrees and 135 degrees, to calculate the intensity values of subordinate polarization pixels with the polarization directions of 45 degrees and 90 degrees that are polarization pixels in other polarization directions (subordinate polarization pixels).

Therefore, the reference image information generated in the second operation of the information compression unit includes information indicating a reference average intensity value calculated for each color by using the intensity values of the reference polarization pixels with a plurality of polarization directions and includes information indicating reference intensity values that are intensity values of reference polarization pixels with the polarization directions designated in advance from the combinations of the polarization pixels with the polarization directions that allow to calculate the average intensity value. The difference information includes information indicating the difference between the average intensity value, which is calculated for each color by using the intensity values of the polarization pixels different from the reference polarization pixels, and the reference average intensity value of the same color and includes information indicating the difference between the intensity value of the polarization pixel different from the reference polarization pixel and the reference intensity value of the same color and the same polarization direction.

Figure 9:
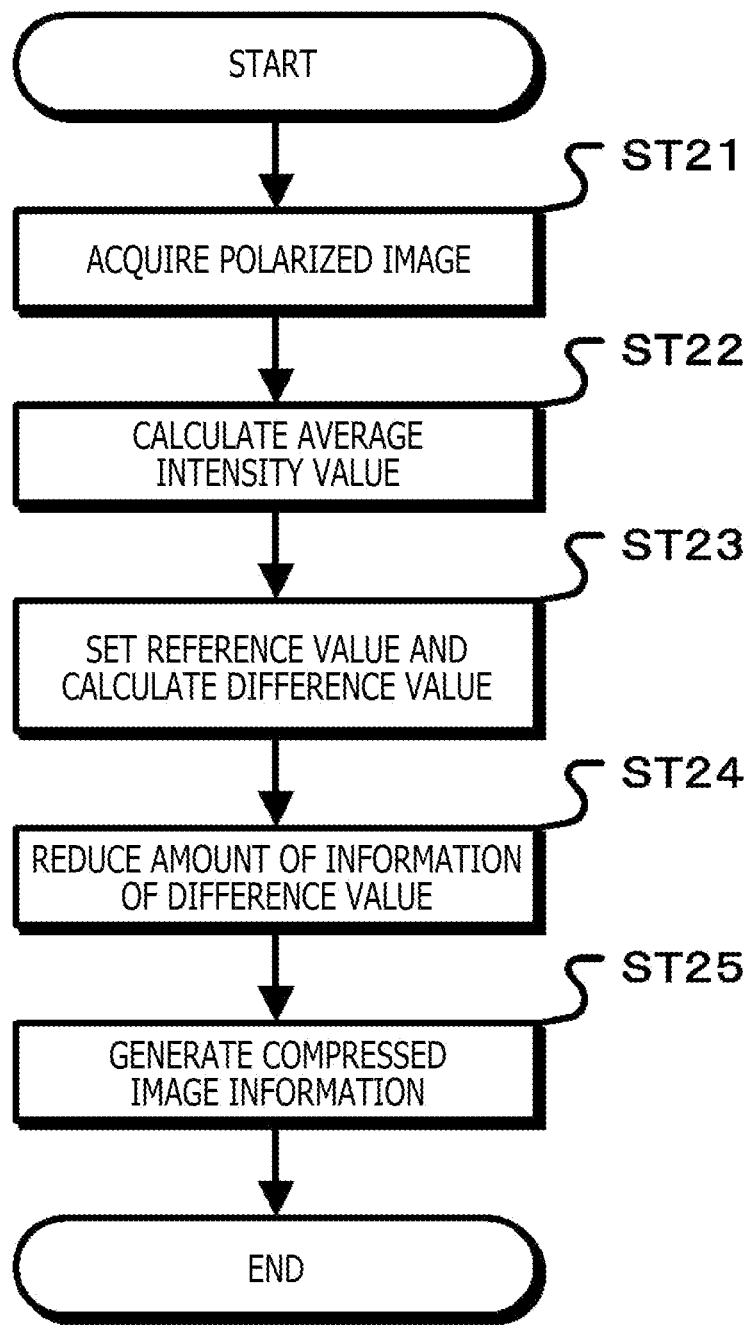
FIG. 9 is a flow chart illustrating a second operation of the information compression unit according to the first configuration.

FIG. 9 is a flow chart illustrating the second operation of the information compression unit according to the first configuration. In step S21, the information compression unit acquires the polarized image. The information compression unit 40 acquires the polarized image generated by the polarization imaging unit 20 and proceeds to step ST22.

In step ST22, the information compression unit calculates the average intensity value. The information compression unit 40 calculates the average intensity value for each color based on the intensity values of the polarization pixels of the same color and different polarization directions positioned in the vicinity and proceeds to step ST23.

In step ST23, the information compression unit sets the reference value and calculates the difference value. For each color, the information compression unit 40 sets, as reference polarization pixels, the polarization pixels of the same color and different polarization directions used for calculating one average intensity value and sets, as reference average intensity value, the average intensity value calculated for each color by using the intensity values of the reference polarization pixels. In addition, the information compression unit 40 sets the designated polarization pixel as a reference polarization pixel for each color and sets the intensity value of the reference polarization pixel of each color as a reference intensity value. Furthermore, the information compression unit 40 calculates the difference value between the average intensity value, which is calculated by using the intensity values of the polarization pixels later in the order of pixel than the reference polarization pixels, and the reference intensity value of the same color and calculates the difference value between the intensity value of each of the polarization pixels later in the order of pixel than the reference polarization pixels and the reference intensity value of the same color and the same polarization. The information compression unit 40 proceeds to step ST24.

In step ST24, the information compression unit reduces the amount of information of the difference value. The information compression unit 40 sets the bit width of the difference value to a width smaller than the bit width of the reference values (reference average intensity value and reference intensity value) and proceeds to step ST25.

In step ST25, the information compression unit generates the compressed image information. The information compression unit 40 sets the reference value set in step ST23 as reference image information and sets the difference value with the amount of information reduced in step ST24 as difference information to generate the compressed image information including the reference image information and the difference information.

FIG. 10 is a diagram for describing the second operation of the information compression unit according to the first configuration. Note that (a) of FIG. 10 illustrates the case in which the polarized image acquired by the polarization imaging unit is a black and white polarized image, and (b) and (c) of FIG. 10 illustrate the case in which the polarized image acquired by the polarization imaging unit is a color polarized image.

In (a) of FIG. 10, the information compression unit 40 sets the polarization pixels of 0 degrees and 135 degrees as designated polarization pixels in the set of 0 degrees and 90 degrees and the set of 45 degrees and 135 degrees and sets, as reference intensity values, the intensity values of polarization pixels P(0,0) and P(1,0) that are the first designated polarization pixels. A polarization pixel P(2,0) is the second pixel with the polarization direction of 0 degrees, and the information compression unit 40 calculates the difference value between the intensity value of the polarization pixel P(2,0) and the reference intensity value of the same polarization. In addition, a polarization pixel P(3,0) is the second pixel with the polarization direction of 135 degrees, and the information compression unit 40 calculates the difference value between the intensity value of the polarization pixel P(3,0) and the reference intensity value of the same polarization. Similarly, for each pixel of the first line, the information compression unit 40 calculates the difference value between the intensity value of the designated polarization pixel different from the reference polarization pixel and the reference intensity value of the same polarization.

Next, pixels of the second line can be used to calculate a first average intensity value by using the intensity values of polarization pixels P(0,0), P(1,0), P(0,1), and P(1,1) included in a pixel block B(0,0). Therefore, the polarization pixels P(0,0), P(1,0), P(0,1), and P(1,1) are set as reference polarization pixels, and the calculated average intensity value is set as a reference average intensity value. In addition, the intensity values of polarization pixels P(2,0), P(3,0), P(2,1), and P(3,1) included in a pixel block B(1,0) can be used to calculate an average intensity value. Therefore, the difference value between the average intensity value calculated by using the intensity values of P(2,0), P(3,0), P(2,1), and P(3,1) and the reference average intensity value is calculated. Note that the polarization pixels P(0,1), P(1,1), P(2,1), and P(3,1) of the second line are subordinate polarization pixels, and the information compression unit 40 does not calculate the difference value.

A similar process is executed, and the information compression unit 40 calculates the difference value between the average intensity value, which is calculated based on the intensity values of the polarization pixels with four polarization directions different from the reference polarization pixels, and the reference average intensity value. The information compression unit 40 calculates the difference value between the intensity value of the designated polarization pixel and the reference intensity value of the same polarization. Furthermore, in the case where the reference average intensity value and the reference intensity value of the designated polarization pixel have m bits, the information compression unit 40 reduces the bit width of the calculated difference value to n bits (n<m bits) to reduce the amount of information of the difference information. Therefore, the amount of information (amount of data) of the compressed image information including the reference image information and the difference information can be smaller than the amount of information of the polarized image. In addition, information regarding the subordinate polarization pixels is not included in the compressed image information, and the amount of information can efficiently be reduced.

Furthermore, in the case of (b) in FIG. 10, the process described with reference to (a) of FIG. 10 is executed for each color. For example, the information compression unit 40 sets, as a reference polarization pixel, each polarization pixel of a green pixel block BG(0,0) of 2×2 pixels with different polarization directions and sets, as a reference average intensity value, the average intensity value calculated by using the intensity values of the green pixel block BG(0,0). In addition, the information compression unit 40 sets, as reference intensity values, the intensity values of the polarization pixels of 0 degrees and the polarization pixels of 135 degrees in the green pixel block BG(0,0). In addition, for each of green pixel blocks BG(1,0), BG(0,1), and BG(1,1), the information compression unit 40 calculates the average intensity value and calculates the difference value between the average intensity value and the reference average intensity value. Furthermore, the information compression unit 40 calculates the difference value between each intensity value of the polarization pixels with the polarization directions of 0 degrees and 135 degrees in the green pixel blocks BG(1,0), BG(0,1), and BG(1,1) and the reference intensity value of the same polarization. Similarly, for the green polarization pixels, the red polarization pixels, and the blue polarization pixels, the information compression unit 40 sets the average intensity values, the polarization pixels with the polarization directions of 0 degrees and 135 degrees, and the reference intensity values for the intensity values, and calculates the difference values. Furthermore, in the case where the reference average intensity value and the reference intensity value of the designated polarization pixel have m bits, the information compression unit 40 reduces the bit width of the calculated difference value to n bits (n<m bits) to reduce the amount of the difference information. Therefore, the amount of information (amount of data) of the compressed image information including the reference image information and the difference information can be smaller than the amount of information of the polarized image. In addition, the information regarding the subordinate polarization pixels is not included in the compressed image information, and the amount of information can efficiently be reduced.

Furthermore, in the case of (c) in FIG. 10, the information compression unit 40 can use the intensity values of polarization pixels P(0,0), P(2,0), P(0,2), and P(2,2) to calculate a first average intensity value of the green polarization pixels. Therefore, the information compression unit 40 sets the polarization pixels P(0,0), P(2,0), P(0,2), and P(2,2) as reference polarization pixels and sets the calculated average intensity value as a reference average intensity value. In addition, the information compression unit 40 sets the polarization pixel P(0,0) with the polarization direction of 0 degrees and the polarization pixel P(2,0) with the polarization direction of 135 degrees as reference polarization pixels to set the intensity values as references. Subsequently, the information compression unit 40 calculates the difference value between the average intensity value, which is calculated from the pixel values of four polarization pixels of the same color and different polarization directions that are one pixel away from each other in the horizontal direction and the vertical direction, and the reference average intensity value. The information compression unit 40 calculates the difference value between each intensity value of the designated polarization pixels with the polarization directions of 0 degrees and 135 degrees and the reference intensity value in the corresponding polarization direction. In addition, for the red polarization pixels and the blue polarization pixels, the information compression unit 40 similarly sets the average intensity values, the designated polarization pixels with the polarization directions of 0 degrees and 135 degrees, and the reference values (reference average intensity values and reference intensity values) for the intensity values and calculates the difference values. Furthermore, in the case where the reference value of the average intensity value and the reference value of the designated polarization pixel have m bits, the information compression unit 40 reduces the bit width of the calculated difference value to n bits (n<m bits) to reduce the amount of information of the difference information. Therefore, the amount of information (amount of data) of the compressed image information including the reference image information and the difference information can be smaller than the amount of information of the polarized image. In addition, the information regarding the subordinate polarization pixels is not included in the compressed image information, and the amount of information can efficiently be reduced.

Furthermore, as illustrated in (d) of FIG. 10, polarization pixels with four polarization directions (for example, polarization pixels P(0,0), P(1,0), P(2,0), and P(3,0)) can be set as a pixel block, and the pixel blocks can be arranged in a line direction to provide a pixel arrangement. In this way, the difference value of the average intensity value and the difference value of a viewpoint polarization pixel can be calculated for each line.

Figure 11:
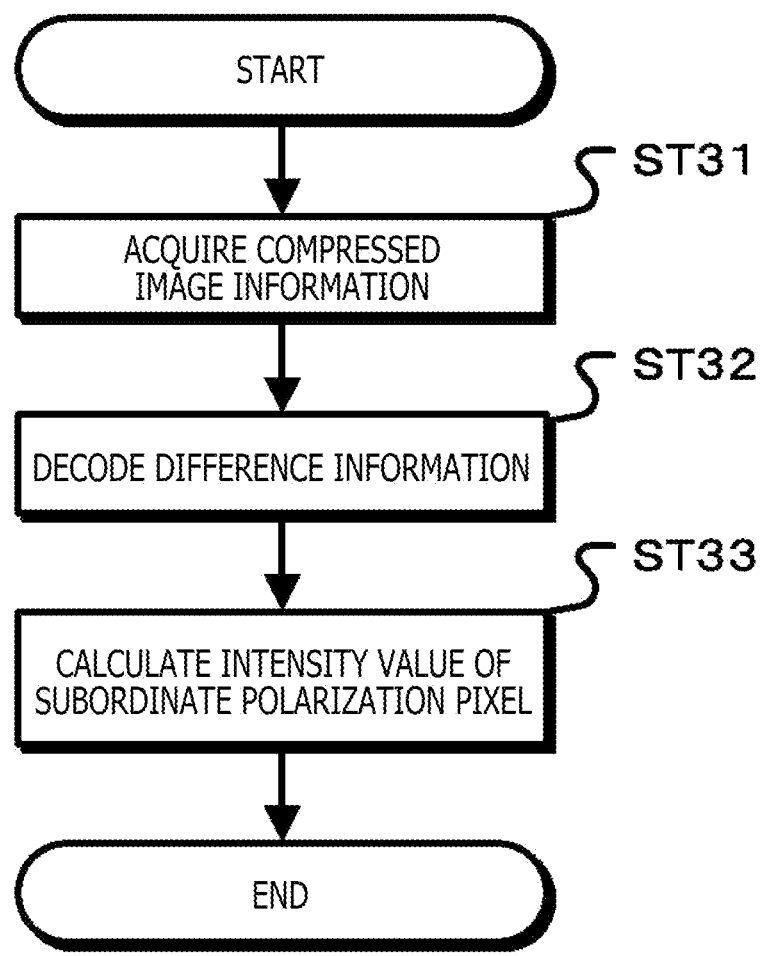
FIG. 11 is a flow chart illustrating the second operation of the information decoding unit according to the first configuration.

FIG. 11 is a flow chart illustrating the second operation of the information decoding unit according to the first configuration. In step ST31, the information decoding unit acquires the compressed image information. The information decoding unit 70 acquires the compressed image information generated by the information compression unit 40 through the recording medium 50 or the transmission path 60 and proceeds to step ST32.

In step ST32, the information decoding unit decodes the difference information. The information decoding unit 70 adds the difference value indicated in the difference information and the reference values (reference polarization intensity value and reference intensity value) of the same color and the same polarization as the difference value to decode the average intensity value and the intensity value of the designated polarization pixel and proceeds to step ST33.

In step ST33, the information decoding unit calculates the intensity value of the subordinate polarization pixel. The information decoding unit 70 calculates the intensity value of the subordinate polarization pixel from the average intensity value obtained in step ST32 and the intensity value of the designated polarization pixel.

According to the second operation as described above, the amount of information of the polarized image can efficiently be reduced. In addition, since the amount of information (amount of data) can be reduced, the polarized image can efficiently be delivered. In addition, the information regarding the subordinate polarization pixels is not included in the compressed image information, and the amount of information can efficiently be reduced.

<3-3. Third Operation of Information Compression Unit and Information Decoding Unit According to First Configuration>

Although the average intensity value varies in each color in the polarized image, a ratio of the intensity value in each polarization direction does not significantly vary depending on the color. Therefore, a compression process based on this nature of polarization is executed in a third operation of the information compression unit.

Therefore, the reference image information generated in the third operation of the information compression unit includes information of the reference average intensity value calculated for each color by using the intensity values of the reference polarization pixels with a plurality of polarization directions. The difference information includes information indicating the difference between the average intensity value, which is calculated for each color by using the intensity values of the polarization pixels with a plurality of polarization directions different from the reference polarization pixels, and the reference average intensity value of the same color and includes information indicating the difference between the ratio of each intensity value in the pixel block of the polarization pixels different from the reference polarization pixels and the ratio of the intensity value of each of the polarization pixels in an adjacent pixel block.

Figure 12:
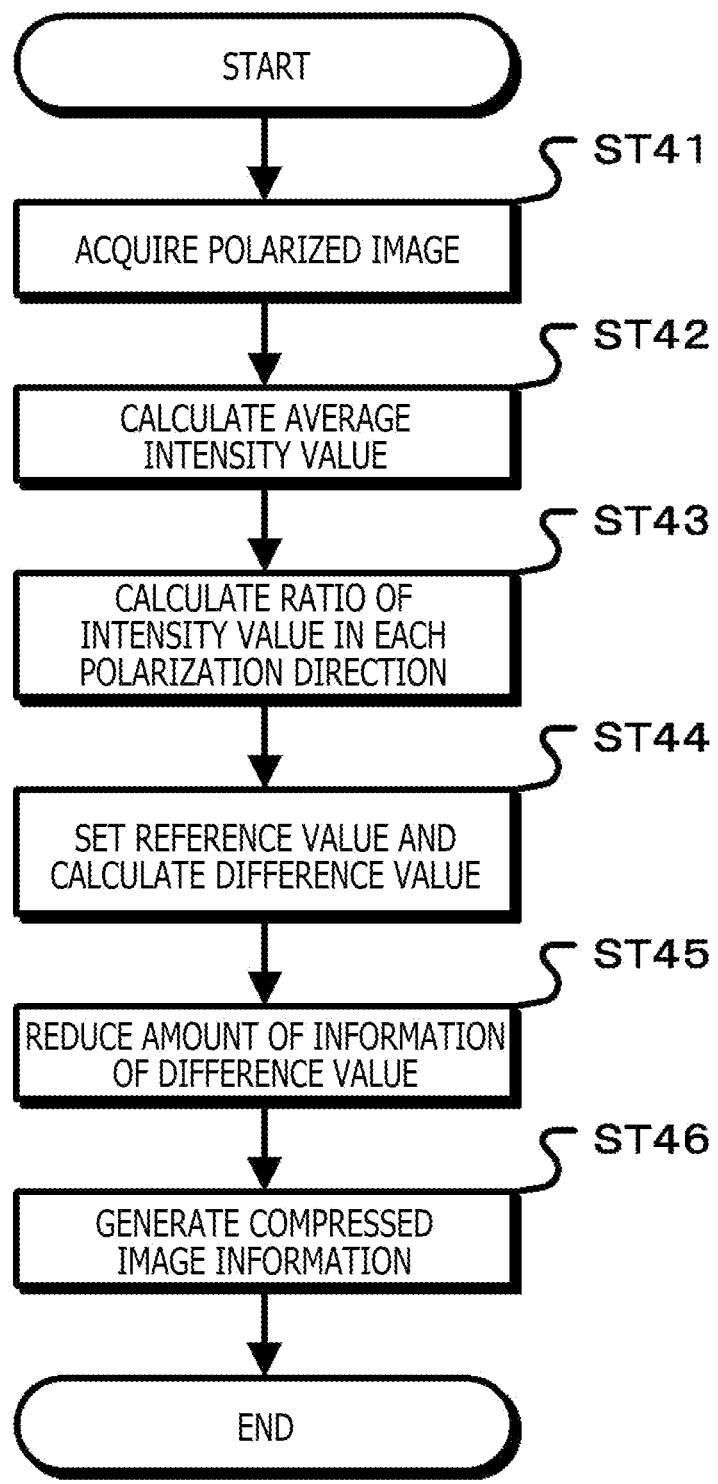
FIG. 12 is a flow chart illustrating a third operation of the information compression unit according to the first configuration.

FIG. 12 is a flow chart illustrating the third operation of the information compression unit according to the first configuration. In step ST41, the information compression unit acquires the polarized image. The information compression unit 40 acquires the polarized image generated by the polarization imaging unit 20 and proceeds to step ST42.

In step ST42, the information compression unit calculates the average intensity value. The information compression unit 40 calculates the average intensity value for each color based on the intensity values of the polarization pixels of the same color and different polarization directions positioned in the vicinity and proceeds to step ST43.

In step ST43, the information compression unit calculates the ratio of the intensity value in each polarization direction. The information compression unit 40 calculates the ratio of the intensity value for each polarization direction from the intensity values of the polarized image with a plurality of polarization directions used for calculating the average intensity value and proceeds to step ST44.

In step ST44, the information compression unit sets the reference value and calculates the difference value. For each color, the information compression unit 40 sets, as reference polarization pixels, the polarization pixels of the same color and different polarization directions used for calculating one average intensity value and sets, as a reference average intensity value, the average intensity value calculated for each color by using the intensity values of the reference polarization pixels. Subsequently, the information compression unit 40 calculates the difference value between the average intensity value, which is calculated by using the intensity values of the polarization pixels later in the order of pixel than the reference polarization pixels, and the reference average intensity value of the same color. In addition, the information compression unit 40 uses the ratio of the pixel block adjacent to the pixel block with a plurality of polarization directions, which is used for calculating the average intensity value for which the difference value between the average intensity value and the reference average intensity value is calculated, to calculate, for each polarization direction, the difference value between the ratio of the pixel block with a plurality of polarization directions used for calculating the average intensity value and the ratio of the adjacent pixel block and proceeds to step ST45.

In step ST45, the information compression unit reduces the amount of information of the difference value. The information compression unit 40 sets the bit width of the difference value to a width smaller than the bit width of the reference value and proceeds to step ST46.

In step ST46, the information compression unit generates the compressed image information. The information compression unit 40 sets the reference value set in step ST44 as reference image information and sets the difference value with the amount of information reduced in step ST45 as difference information to generate the compressed image information including the reference image information and the difference information.

Figure 13:
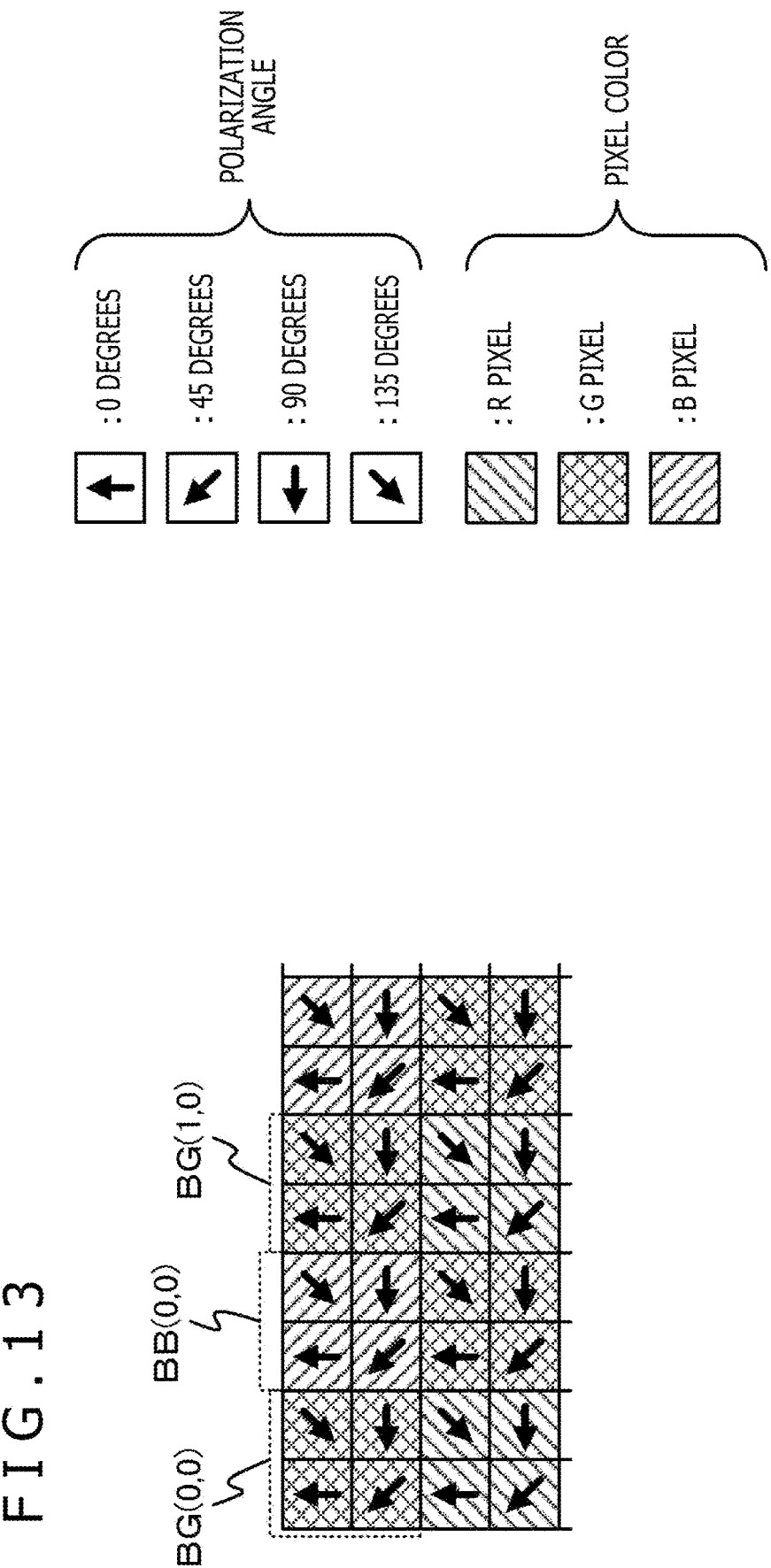
FIG. 13 is a diagram for describing the third operation of the information compression unit according to the first configuration.

FIG. 13 is a diagram for describing the third operation of the information compression unit according to the first configuration. For example, the information compression unit 40 sets, as a reference polarization pixel, each polarization pixel of a green pixel block BG(0,0) of 2×2 pixels with different polarization directions and sets, as a reference average intensity value, the average intensity value calculated by using the intensity values of the green pixel block BG(0,0). Subsequently, the information compression unit 40 calculates the difference value between the average intensity value of a green pixel block BG(1,0) and the reference average intensity value.

In addition, the information compression unit 40 calculates the ratios of the intensity values of the polarization pixels in a blue pixel block BB(0,0) adjacent to the green pixel block BG(1,0). For example, the intensity value of the blue polarization pixel with the polarization direction of 0 degrees will be referred to as "IB0," and the intensity values of the blue polarization pixels with the polarization directions of 45 degrees, 90 degrees, and 135 degrees will be referred to as "IB45," "IB90," and "IB135," respectively. In this case, a ratio rB0 of the intensity value of the blue polarization pixel with the polarization pixel of 0 degrees is "rB0=IB0/(IB0+IB45+IB90+IB135)." In addition, ratios rB45, rB90, and rB135 of the intensity values of the blue polarization pixels with the polarization directions of 45 degrees, 90 degrees, and 135 degrees are calculated. Note that the ratio of the intensity value in each polarization direction calculated as described above is a value normalized such that a sum of the ratios becomes "1."

The information compression unit 40 calculates ratios rG0, rG45, rG90, and rG135 of the intensity values of the polarization pixels in the green pixel BG(1,0) and calculates, for each polarization direction, the difference value between the ratio and the ratio of the blue pixel block BB(0,0).

A similar process is executed, and the information compression unit 40 calculates the difference value between the average intensity value, which is calculated based on the intensity values of the polarization pixels with four different polarization directions that are polarization pixels different from the reference polarization pixels, and the reference average intensity value and calculates the difference value between the ratio of the intensity value of each of the polarization pixels with four polarization directions and the ratio of the adjacent pixel block. In addition, the information compression unit 40 executes a similar process for the red pixel blocks and the blue pixel blocks.

In the case where the reference average intensity value has m bits, the information compression unit 40 reduces the bit width of the calculated difference value of the average intensity value to n bits (n<m bits). Furthermore, the ratio of the intensity value in each polarization direction does not significantly vary depending on the color. Therefore, the difference value of the ratio is small, and the bit width of the difference value of the ratio can be set to a width smaller than m bits or n bits to further reduce the amount of information of the difference information. Therefore, the amount of information (amount of data) of the compressed image information including the reference image information and the difference information can be smaller than the amount of information of the polarized image.

Note that, although FIG. 13 illustrates the case in which the polarization pixels are red, green, and blue, a compression process similar to the process described above can also be executed in a case where white polarization pixels are included.

Figure 14:
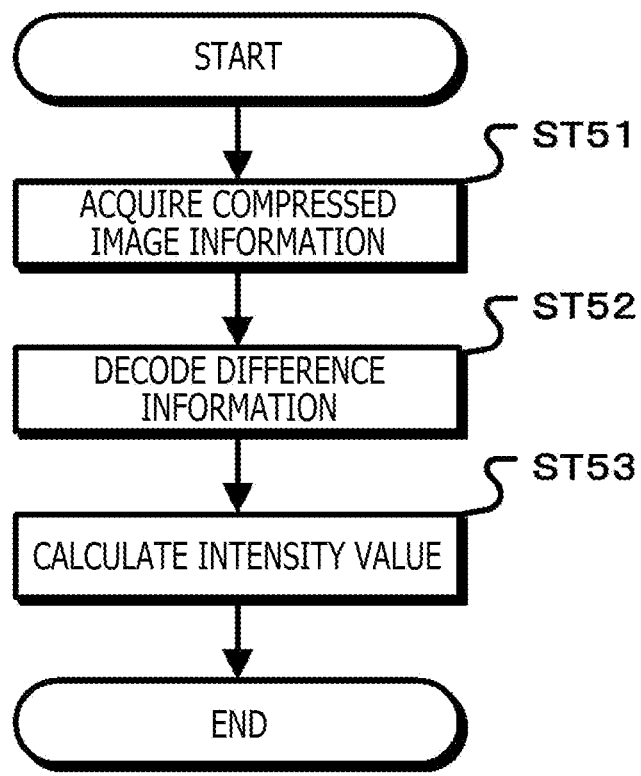
FIG. 14 is a flow chart illustrating the third operation of the information decoding unit according to the first configuration.

FIG. 14 is a flow chart illustrating the third operation of the information decoding unit according to the first configuration. In step S51, the information decoding unit acquires the compressed image information. The information decoding unit 70 acquires the compressed image information generated by the information compression unit 40 through the recording medium 50 or the transmission path 60 and proceeds to step ST52.

In step ST52, the information decoding unit decodes the difference information. The information decoding unit 70 adds the difference value of the average intensity value indicated in the difference information and the reference average intensity value to calculate the average intensity value. In addition, the information decoding unit 70 adds the difference value of the ratio indicated in the difference information and the ratio of the adjacent polarization block in each polarization direction to decode the ratio of the intensity value of the polarization pixel in the pixel block for which the average intensity value is calculated. The information decoding unit 70 proceeds to step ST53.

In step ST53, the information decoding unit calculates the intensity value. The information decoding unit 70 calculates the intensity value of the polarization pixel in each polarization direction in the pixel block for which the average intensity value is calculated, from the average intensity value and the ratio of the intensity value in each polarization direction obtained in step ST52.

According to the third operation, the amount of information of the polarized image can efficiently be reduced. In addition, since the amount of information (amount of data) can be reduced, the polarized image can efficiently be delivered. In addition, a characteristic of polarization that the ratio of the intensity value in each polarization direction does not significantly vary depending on the color is used to generate the difference information, and the amount of information of the difference information can efficiently be reduced.

<3-4. Fourth Operation of Information Compression Unit and Information Decoding Unit According to First Configuration>

Although the difference value between the ratio of the intensity value in each polarization direction and the reference value is calculated in the third operation of the information compression unit described above, a predicted value can be calculated based on the average intensity value and the ratio of the intensity value of the adjacent pixel block, and the difference value between the intensity value and the predicted value can be used as difference information.

Therefore, the reference image information generated in a fourth operation of the information compression unit includes information indicating the reference average intensity value calculated for each color by using the intensity values of the reference polarization pixels with a plurality of polarization directions. The difference information includes information indicating the difference between the average intensity value, which is calculated for each color by using the intensity values of the polarization pixels with a plurality of polarization directions different from the reference polarization pixels, and the reference average intensity value of the same color and includes information indicating the difference between each intensity value of the polarization pixels with a plurality of polarization directions different from the reference polarization pixels and the predicted value of the same polarization direction. The predicted value is calculated for each polarization direction based on the average intensity value calculated in the pixel block of the polarization pixels different from the reference polarization pixels and the ratios of the intensity values of the polarization pixels in the pixel block adjacent to the pixel block.

Figure 15:
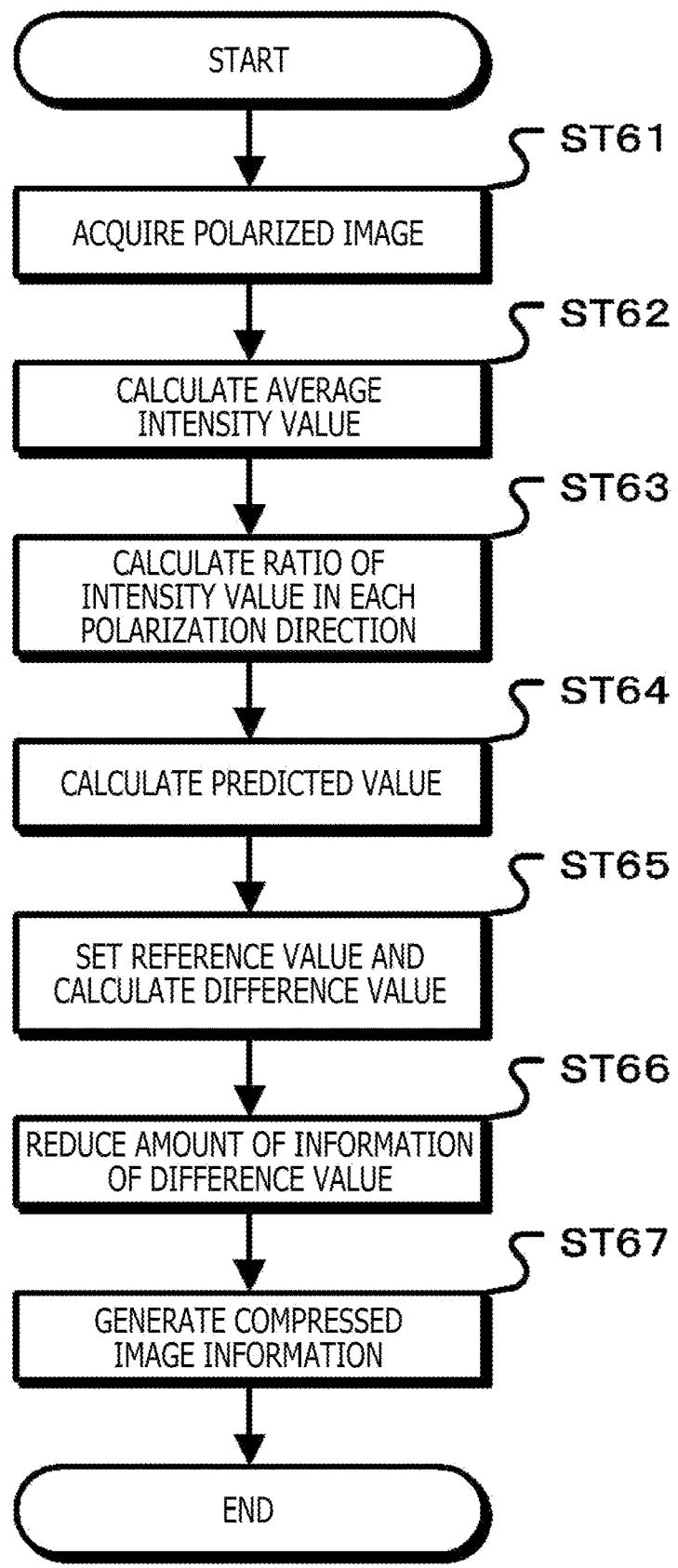
FIG. 15 is a flow chart illustrating a fourth operation of the information compression unit according to the first configuration.

FIG. 15 is a flow chart illustrating the fourth operation of the information compression unit according to the first configuration. In step ST61, the information compression unit acquires the polarized image. The information compression unit 40 acquires the polarized image generated by the polarization imaging unit 20 and proceeds to step ST62.

In step ST62, the information compression unit calculates the average intensity value. The information compression unit 40 calculates the average intensity value for each color based on the intensity values of the polarization pixels of the same color and different polarization directions positioned in the vicinity and proceeds to step ST63.

In step ST63, the information compression unit calculates the ratio of the intensity value in each polarization direction. The information compression unit 40 calculates the ratio of the intensity value in each polarization direction from the intensity values of the polarized image with a plurality of polarization directions used for calculating the average intensity value and proceeds to step ST64.

In step ST64, the information compression unit calculates the predicted value. The information compression unit 40 calculates the predicted value in each polarization direction based on the average intensity value of the pixel block and the ratio of the intensity value of the adjacent pixel block and proceeds to step ST65.

In step ST65, the information compression unit sets the reference value and calculates the difference value. For each color, the information compression unit 40 sets, as reference polarization pixels, the polarization pixels of the same color and different polarization directions used for calculating one average intensity value and sets, as a reference average intensity value, the average intensity value calculated for each color by using the intensity values of the reference polarization pixels. Subsequently, the information compression unit 40 calculates the difference value between the average intensity value, which is calculated by using the intensity values of the polarization pixels later in the order of pixel than the reference polarization pixels, and the reference average intensity value of the same color. In addition, the information compression unit 40 uses the average intensity value, for which the difference value between the average intensity value and the reference average intensity value is calculated, and the ratio of the pixel block, which is adjacent to the pixel block with a plurality of polarization directions used for calculating the average value, to calculate the predicted value. Furthermore, the information compression unit 40 calculates, for each polarization direction, the difference value between the intensity value of the pixel block with a plurality of polarization directions, which is used for calculating the average intensity value, and the predicted value and proceeds to step ST66.

In step ST66, the information compression unit reduces the amount of information of the difference value. The information compression unit 40 sets the bit width of the difference value to a width smaller than the bit width of the reference average intensity value and proceeds to step ST66.

In step ST67, the information compression unit generates the compressed image information. The information compression unit 40 sets the reference value set in step ST65 as reference image information and sets the difference value with the amount of information reduced in step ST66 as difference information to generate the compressed image information including the reference image information and the difference information.

Next, the fourth operation of the information compression unit will be described with reference to FIG. 13. For example, the information compression unit 40 sets, as a reference polarization pixel, each polarization pixel of the green pixel block BG(0,0) of 2×2 pixels with different polarization directions and sets, as a reference average intensity value, the average intensity value calculated by using the intensity values of the green pixel block BG(0,0). Subsequently, the information compression unit 40 calculates the difference value between the average intensity value of the green pixel block BG(1,0) and the reference average intensity value.

In addition, the information compression unit 40 calculates the ratios of the intensity values of the polarization pixels in the blue pixel block BB(0,0) adjacent to the green pixel block BG(1,0). For example, the intensity value of the blue polarization pixel with the polarization direction of 0 degrees will be referred to as "IB0," and the intensity values of the blue polarization pixels with the polarization directions of 45 degrees, 90 degrees, and 135 degrees will be referred to as "IB45," "IB90," and "IB135," respectively. In this case, a ratio rB0 of the intensity value of the blue polarization pixel with the polarization direction of 0 degrees is "rB0=IB0/(IB0+IB45+IB90+IB135)." In addition, ratios rB45, rB90, and rB135 of the intensity values of the blue polarization pixels with the polarization directions of 45 degrees, 90 degrees, and 135 degrees are calculated, and the ratios rB0, rB45, rB90, and rB135 are set as ratios used for calculating the predicted values. Note that the ratio of the intensity value in each polarization direction calculated as described above is a value normalized such that the sum of the ratios becomes "1."

The information compression unit 40 uses an average intensity value IGmean of the green pixel block BG(1,0) and the ratio rB0 of the adjacent blue pixel block BB(0,0) to calculate a predicted value IGd0 with the polarization direction of 0 degrees. In this case, the predicted value IGd0 of the polarization pixel with the polarization direction of 0 degrees is "IGd0=4×IGmean×rB0." Similarly, the information compression unit 40 uses the average intensity value IGmean of the green pixel block BG(1,0) and the ratios rB45, rB90, and rB135 of the adjacent blue pixel block BB(0,0) to calculate respective predicted values IGd45, IGd90, and IGd135 of the polarization directions.

Furthermore, the information compression unit 40 calculates, for each polarization direction, the difference value between the intensity value of each polarization pixel of the green pixel block BG(1,0) and the predicted value of the same polarization.

A similar process is executed, and the information compression unit 40 calculates the difference value between the average intensity value, which is calculated based on the intensity values of the polarization pixels with four polarization directions different from the reference polarization pixels, and the reference average intensity value and calculates the difference value between each intensity value of the polarization pixels with four polarization directions and the predicted value of the same polarization. In addition, the information compression unit 40 executes a similar process for the red pixel blocks and the blue pixel blocks.

In the case where the reference average intensity value has m bits, the information compression unit 40 reduces the bit width of the calculated difference value of the average intensity value to n bits (n<m bits). Furthermore, the ratio of the intensity value in each polarization direction does not significantly vary depending on the color. Therefore, the difference value between the predicted value calculated by using the ratio and the intensity value is small, and the bit width of the difference value between the predicted value and the intensity value can be set to a width smaller than m bits or n bits to further reduce the amount of information of the difference information. Therefore, the amount of information (amount of data) of the compressed image information including the reference image information and the difference information can be smaller than the amount of information of the polarized image.

Note that, although FIG. 13 illustrates the case in which the polarization pixels are red, green, and blue, a compression process similar to the process described above can also be executed in a case where white polarization pixels are included.

Figure 16:
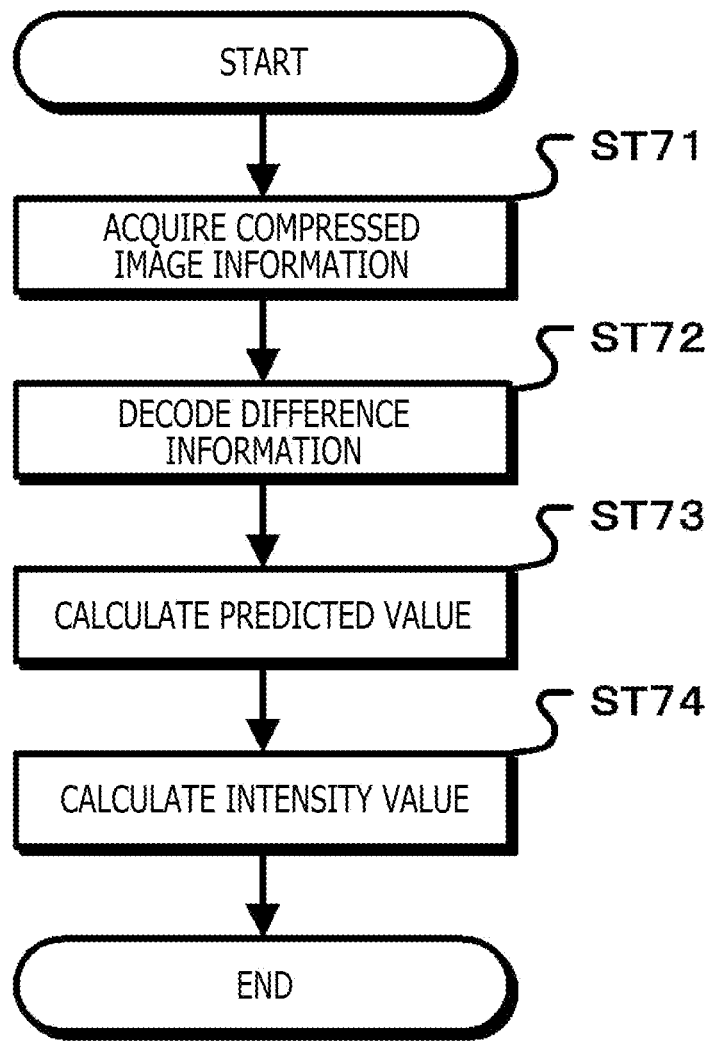
FIG. 16 is a flow chart illustrating the fourth operation of the information decoding unit according to the first configuration.

FIG. 16 is a flow chart illustrating the fourth operation of the information decoding unit according to the first configuration. In step S71, the information decoding unit acquires the compressed image information. The information decoding unit 70 acquires the compressed image information generated by the information compression unit 40 through the recording medium 50 or the transmission path 60 and proceeds to step ST72.

In step ST72, the information decoding unit decodes the difference information. The information decoding unit 70 adds the difference value indicated in the difference information and the reference value (reference average intensity value) of the same color and the same polarization as the difference value to decode the average intensity value and proceeds to step ST73.

In step ST73, the information decoding unit calculates the predicted value. The information decoding unit 70 calculates, for each polarization direction, the predicted value from the ratio of the average intensity value obtained in step ST72 and the intensity value of the adjacent pixel block and proceeds to step ST74.

In step ST74, the information decoding unit calculates the intensity value. The information decoding unit 70 adds, for each polarization direction, the difference value obtained in step ST52 and the predicted value calculated in step ST73 to calculate the intensity value of the polarization pixel in each polarization direction in the pixel block for which the average intensity is calculated.

According to the fourth operation as described above, the amount of information of the polarized image can efficiently be reduced. In addition, the amount of information (amount of data) can be reduced, and the polarized image can efficiently be delivered. In addition, the characteristic of polarization that the ratio of the intensity value in each polarization direction does not significantly vary depending on the color is used to generate the difference information, and the amount of information of the difference information can efficiently be reduced.

<3-5. Fifth Operation of Information Compression Unit and Information Decoding Unit According to First Configuration>

Next, in a case described in a fifth operation, polarization pixels and normal pixels are included in the polarized image acquired by the polarization imaging unit 20.

The intensity value of the normal pixel indicates a value twice the average intensity value. Therefore, the intensity values of the normal pixels and the designated polarization pixels are used to set the reference values and calculate the difference values, and the intensity values of the subordinate polarization pixels are calculated from the intensity values of the normal pixels and the designated polarization pixels at decoding.

Therefore, the reference image information generated in the fifth operation of the information compression unit includes information indicating an unpolarized reference intensity value that is an intensity value of a reference normal pixel of each color and includes information indicating a reference intensity value that is an intensity value of a reference polarization pixel with the polarization direction designated in advance from the combinations of the polarization pixels with the polarization directions that allow to calculate the average intensity value. The difference information includes information indicating the difference between the intensity value of the normal pixel different from the reference normal pixel and the unpolarized reference intensity value of the same color and includes information indicating the difference between the intensity value of the polarization pixel in the same polarization direction that is a polarization pixel different from the reference polarization pixel and the reference intensity value in the same polarization direction.

Figure 17:
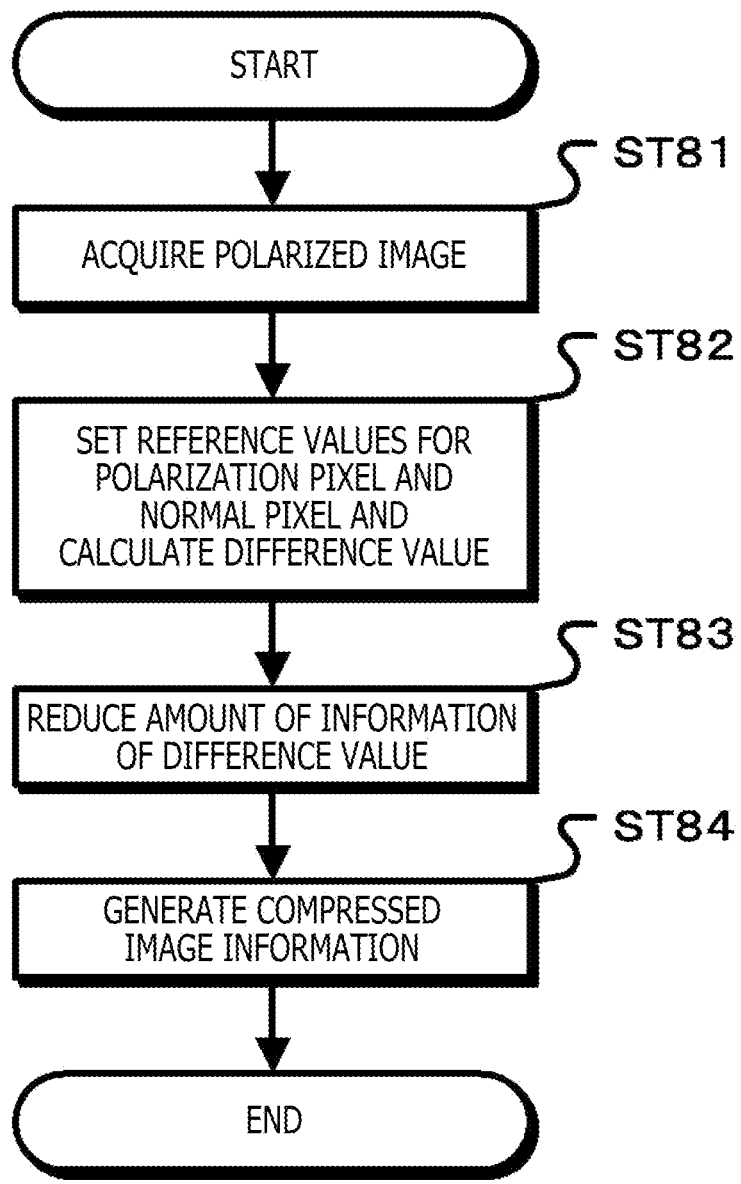
FIG. 17 is a flow chart illustrating a fifth operation of the information compression unit according to the first configuration.

FIG. 17 is a flow chart illustrating the fifth operation of the information compression unit according to the first configuration. In step ST81, the information compression unit acquires the polarized image including polarization pixels and normal pixels. The information compression unit 40 acquires the polarized image generated by the polarization imaging unit 20 and proceeds to step ST82.

In step ST82, the information compression unit sets the reference values for the polarization pixels and the normal pixels and calculates the difference values. The information compression unit 40 sets the reference polarization pixel for each pixel of the same color and the same polarization in the polarized image and sets the intensity value of the reference polarization pixel as a reference intensity value. In addition, the information compression unit 40 sets the reference normal pixel for each color of the normal pixels and sets the intensity value of the reference normal pixel as an unpolarized reference intensity value. The information compression unit 40 calculates the difference value between the intensity value of each of the polarization pixels later in the order of pixel than the reference polarization pixels and the reference intensity value of the same color and the same polarization. For example, the information compression unit 40 sets the first pixel as a reference polarization pixel for each of different colors and different polarization directions and sets the reference intensity value. In addition, the information compression unit 40 calculates the difference value between the intensity value of each of the later polarization pixels and the reference intensity value of the same color and the same polarization. Furthermore, the information compression unit 40 calculates the difference value between the intensity value of each of the normal pixels later in the order of pixel than the reference normal pixels and the unpolarized reference intensity value of the same color. For example, the information compression unit 40 sets the first normal pixel of each color as a reference normal pixel and sets the unpolarized reference intensity value. In addition, the information compression unit 40 calculates the difference value between the intensity value of each of the later normal pixels and the unpolarized reference intensity value of the same color and proceeds to step ST83.

In step ST83, the information compression unit reduces the amount of information of the difference value. The information compression unit 40 sets the bit width of the difference value to a width smaller than the bit width of the reference values (reference intensity value and unpolarized reference intensity value) and proceeds to step ST84.

In step ST84, the information compression unit generates the compressed image information. The information compression unit 40 sets the reference value set in step ST82 as reference image information and sets the different value with the amount of information reduced in step ST83 as difference information to generate the compressed image information including the reference image information and the difference information.

FIG. 18 is a diagram for describing the fifth operation of the information compression unit according to the first configuration. Note that (a) of FIG. 18 illustrates a case in which the polarized image acquired by the polarization imaging unit is a black and white polarized image, and (b) of FIG. 18 illustrates a case in which the polarized image acquired by the polarization imaging unit is a color polarized image. In the polarized image, the polarization pixels are the designated polarization pixels described above, such as polarization pixels with the polarization directions of 0 degrees and 135 degrees. Note that the intensity values of the polarization pixels with the polarization directions of 45 degrees and 90 degrees that are subordinate polarization pixels can be calculated in the decoding process as described later.

In (a) of FIG. 18, a polarization pixel $P(0,0)$ is the first pixel with the polarization direction of 0 degrees, and the information compression unit 40 sets the polarization pixel $P(0,0)$ as a reference polarization pixel and sets the intensity value as a reference intensity value. Next, a normal pixel $P(1,0)$ is the first normal pixel, and the information compression unit 40 sets the normal pixel $P(1,0)$ as a reference normal pixel and sets the intensity value as an unpolarized reference intensity value. A polarization pixel P(2,0) is the second pixel with the polarization direction of 0 degrees, and the information compression unit 40 calculates the difference value between the intensity value of the polarization pixel P(2,0) and the reference intensity value of the same polarization. In addition, a normal pixel P(3,0) is the second normal pixel, and the information compression unit 40 calculates the difference value between the intensity value of the normal pixel P(3,0) and the unpolarized reference intensity value of the reference normal pixel. Similarly, the information compression unit 40 sets the intensity values of the reference polarization pixels and the reference normal pixels as reference values (reference intensity values and unpolarized reference intensity values) for the pixels in the first line. The information compression unit 40 calculates the difference value between the intensity value of the polarization pixel different from the reference polarization pixel and the reference intensity value of the same polarization and calculates the difference value between the intensity value of the normal pixel different from the reference normal pixel and the unpolarized reference intensity value.

Next, the information compression unit 40 calculates the difference value between the intensity value of a normal pixel P(0,1) and the intensity value of the reference normal pixel. Note that 2×2 pixels are the reference unit of pixel array in (a) of FIG. 18. Therefore, the normal pixel P(0,1) may be set as a reference normal pixel, and the intensity value may be set as an unpolarized reference intensity value. Since a polarization pixel P(1,1) is the first pixel with the polarization direction of 135 degrees, the information compression unit 40 sets the polarization pixel P(1,1) as a reference polarization pixel and sets the intensity value as a reference intensity value. For each of the later polarization pixels and normal pixels in the horizontal direction, the information compression unit 40 calculates the difference value of the intensity value of the polarization pixel and the reference intensity value of the same polarization and calculates the difference value between the intensity value of the normal pixel and the unpolarized reference intensity value. Note that, in the case where the normal pixel P(0,1) is set as a reference normal pixel, the intensity value of the normal pixel P(0,1) may be used as the unpolarized reference intensity value to calculate the difference value.

Similarly, the information compression unit 40 calculates the difference value, and in the case where the reference values (reference intensity value and unpolarized reference intensity value) indicating the intensity value of the reference polarization pixel and the intensity value of the reference normal pixel with each of two polarization directions have m bits, the information compression unit 40 reduces the bit width of the difference value to n bits (n<m bits) to reduce the amount of information of the difference information. Therefore, the amount of information (amount of data) of the compressed image information including the reference image information and the difference information can be smaller than the amount of information of the polarized image.

Furthermore, in the case of (b) in FIG. 18, the process described with reference to (a) of FIG. 18 is executed for each color. For example, the information compression unit 40 sets, as reference polarization pixels, two polarization pixels (for example, polarization pixels with polarization directions of 0 degrees and 135 degrees) in a green pixel block BG(0,0) of 2×2 pixels and sets the intensity values as reference intensity values. In addition, the information compression unit 40 sets two normal pixels in the green pixel block BG(0,0) as reference normal pixels and sets the intensity values as unpolarized reference intensity values. Subsequently, for each of the green pixel blocks BG(1,0), BG(1,0), BG(0,1), and BG(1,1), the information compression unit 40 calculates the difference value between the intensity value of the polarization pixel and the reference intensity value of the same polarization and calculates the difference value between the intensity value of the normal pixel and the unpolarized reference intensity value at the same position in the block. Similarly, the information compression unit 40 sets the reference value and calculates the difference value for each of the green polarization pixels, the red polarization pixels, and the blue polarization pixels. Furthermore, in the case where the reference values (reference intensity values and unpolarized reference intensity values) that are intensity values of the reference polarization pixels and the reference normal pixels have m bits, the information compression unit 40 reduces the bit width of the difference value to n bits (n<m bits) to reduce the amount of information of the difference information. Therefore, the amount of information (amount of data) of the compressed image information including the reference image information and the difference information can be smaller than the amount of information of the color polarized image.

Figure 19:
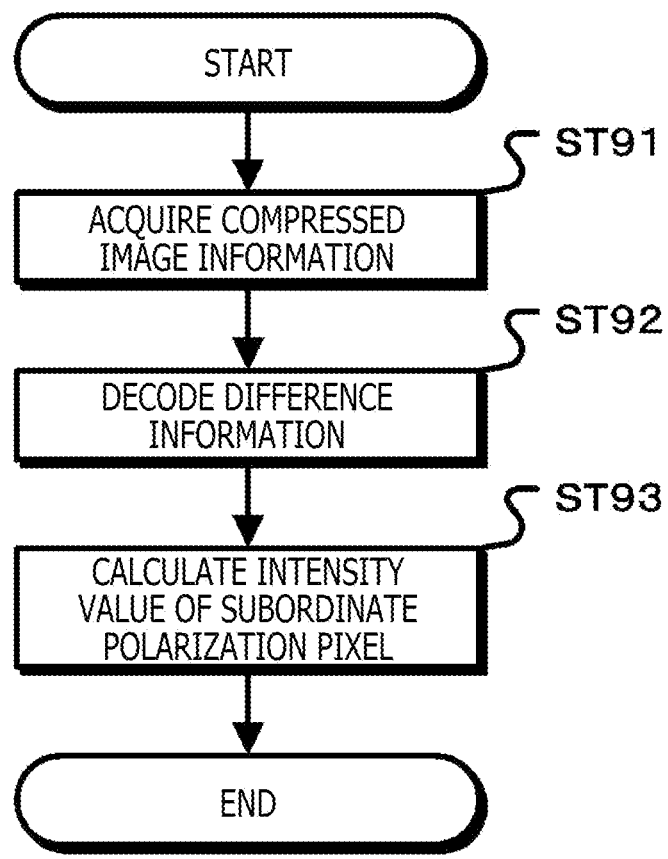
FIG. 19 is a flow chart illustrating the fifth operation of the information decoding unit according to the first configuration.

FIG. 19 is a flow chart illustrating the fifth operation of the information decoding unit according to the first configuration. In step ST91, the information decoding unit acquires the compressed image information. The information decoding unit 70 acquires the compressed image information generated by the information compression unit 40 through the recording medium 50 or the transmission path 60 and proceeds to step ST92.

In step ST92, the information decoding unit decodes the difference information. The information decoding unit 70 adds the difference value of the polarization pixel indicated in the difference information and the reference intensity value of the same color and the same polarization as the difference value to decode the intensity value of the polarization pixel. In addition, the information decoding unit 70 adds the difference value of the normal pixel indicated in the difference information and the unpolarized reference intensity value to decode the intensity value of the normal pixel and proceeds to step ST93.

In step ST93, the information decoding unit calculates the intensity value of the subordinate polarization pixel. The information decoding unit 70 calculates the intensity value of the subordinate polarization pixel based on the intensity values of the normal pixel and the polarization pixel obtained in step ST92. That is, the information decoding unit 70 uses the intensity value Inp of the normal pixel, the intensity value I0 of the polarization pixel with the polarization direction of 0 degrees, and the intensity value I135 of the polarization pixel with the polarization direction of 135 degrees to calculate the intensity values I45 and I90 of the polarization pixels with the polarization directions of 45 degrees and 90 degrees based on the relation of Equation (6) above.

According to the fifth operation as described above, the amount of information of the polarized image can efficiently be reduced even if the normal pixels are included in the polarized image. In addition, since the amount of information (amount of data) can be reduced, the polarized image can efficiently be delivered.

<3-6. Sixth Operation of Information Compression Unit and Information Decoding Unit According to First Configuration>

In a sixth operation of the information compression unit, polarization pixels and normal pixels are included in the polarized image acquired by the polarization imaging unit 20, and the compression process is executed based on the nature of polarization that, although the intensity value of the normal pixel varies in each color in the polarized image, the ratio of the intensity value in each polarization direction does not significantly vary depending on the color.

That is, the reference image information generated in the sixth operation of the information compression unit includes information indicating an unpolarized reference intensity value that is an intensity value of a reference normal pixel of each color. The difference information includes information indicating the difference between the intensity value of the normal pixel different from the reference normal pixel and the unpolarized reference intensity value of the same color and includes information indicating the difference between the ratio of the intensity value of the designated polarization pixel in the pixel block, which includes the designated polarization pixel with the polarization direction designated in advance from the combinations of the normal pixels different from the reference normal pixels and the polarization pixels with the polarization directions that allow to calculate the average intensity value, and the ratio of the intensity value of the designated polarization pixel in the adjacent pixel block.

Figure 20:
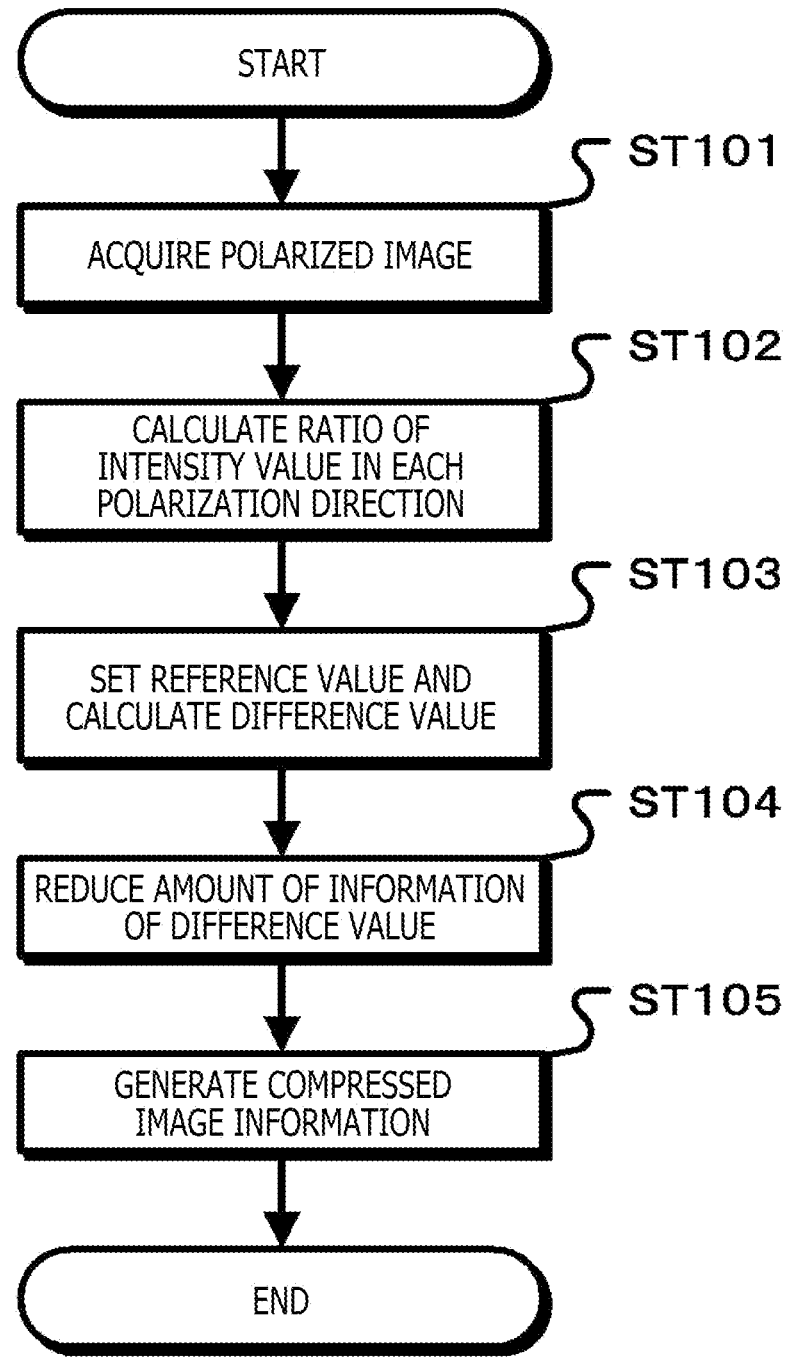
FIG. 20 is a flow chart illustrating a sixth operation of the information compression unit according to the first configuration.

FIG. 20 is a flow chart illustrating the sixth operation of the information compression unit according to the first configuration. In step ST101, the information compression unit acquires the polarized image. The information compression unit 40 acquires the polarized image generated by the polarization imaging unit 20 and proceeds to step ST102.

In step ST102, the information compression unit calculates the ratio of the intensity value in each polarization direction. The information compression unit 40 calculates the ratio of the intensity value in each polarization direction from the intensity value of the polarized image in each polarization direction and proceeds to step ST103.

In step ST103, the information compression unit sets the reference value and calculates the difference value. The information compression unit 40 sets the normal pixel as a reference normal pixel for each color and sets the intensity value of the reference normal pixel as a reference intensity value. Subsequently, the information compression unit 40 calculates the difference value between the intensity value of each of the normal pixels later in the order of pixel than the reference normal pixels and the unpolarized reference intensity value of the same color. In addition, the information compression unit 40 uses the ratio of the pixel block adjacent to the pixel block including normal pixels and polarization pixels with a plurality of polarization directions to calculate, for each polarization direction, the difference value between the ratio of the pixel block and the ratio of the adjacent pixel block and proceeds to step ST104.

In step ST104, the information compression unit reduces the amount of information of the difference value. The information compression unit 40 sets the bit width of the difference value to a width smaller than the bit width of the reference value and proceeds to step ST105.

In step ST105, the information compression unit generates the compressed image information. The information compression unit 40 sets the reference value set in step ST103 as reference image information and sets the difference value with the amount of information reduced in step ST104 as difference information to generate the compressed image information including the reference image information and the difference information.

Figure 21:
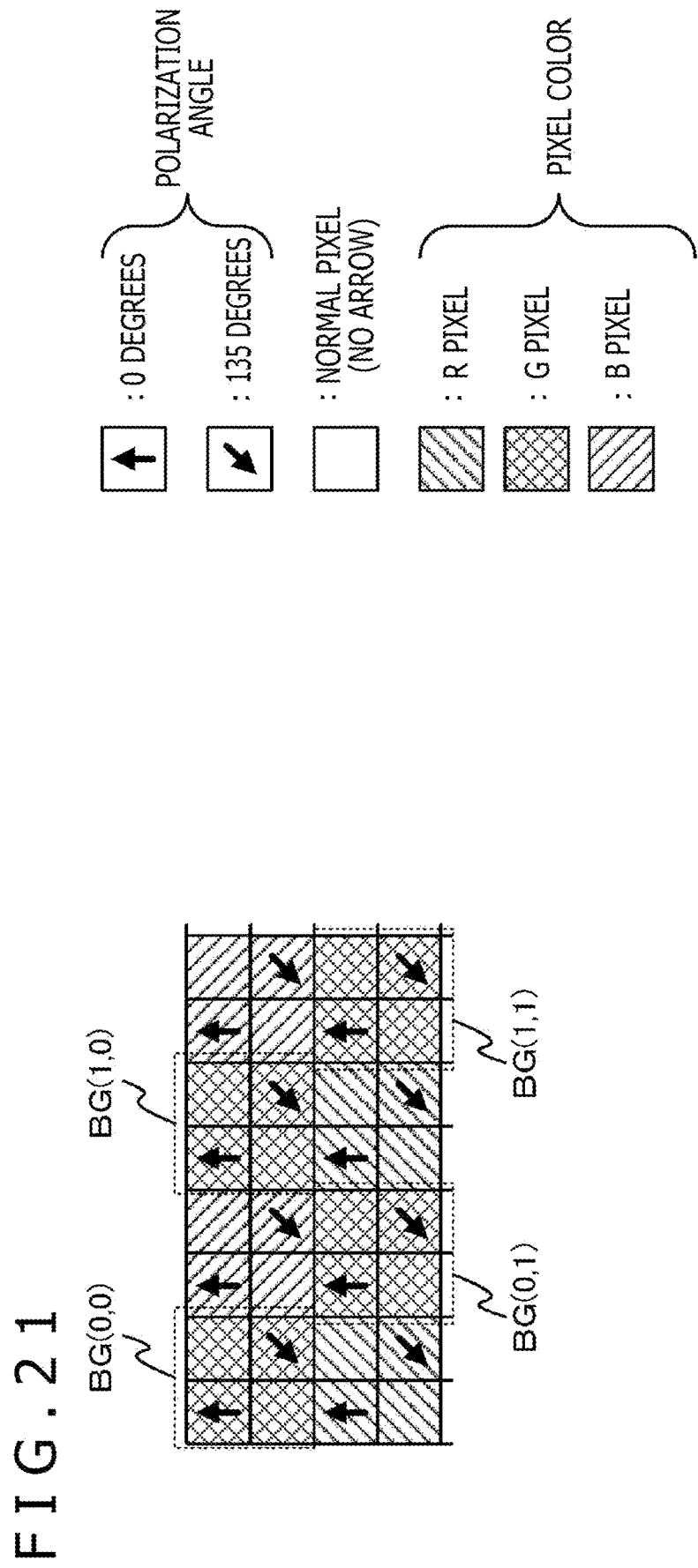
FIG. 21 is a diagram for describing the sixth operation of the information compression unit according to the first configuration.

FIG. 21 is a diagram for describing the sixth operation of the information compression unit according to the first configuration. For example, in a green pixel block BG(0,0) of 2×2 pixels including designated polarization pixels with two different polarization directions and two normal pixels, the information compression unit 40 sets the normal pixels as reference normal pixels and sets the intensity values as unpolarized reference intensity values. Subsequently, the information compression unit 40 calculates the difference value between the intensity value of each of the normal pixels in a green pixel block BG(1,0) and the unpolarized reference intensity value at the equal position in the block.

In addition, the information compression unit 40 calculates the ratio of the intensity value of each of the polarization pixels in a blue pixel block BB(0,0) adjacent to the green pixel block BG(1,0). For example, the intensity value of the blue polarization pixel with the polarization direction of 0 degrees will be referred to as "IB0," and the intensity value of the blue polarization pixel with the polarization direction of 135 degrees will be referred to as "IB135." In this case, a ratio rB0 of the intensity value of the blue polarization pixel with the polarization direction of 0 degrees is "rB0=IB0/(IB0+IB135)." In addition, the information compression unit 40 calculates a ratio rB135 of the intensity value of the blue polarization pixel with the polarization direction of 135 degrees. Note that the ratio of the intensity value in each polarization direction calculated as described above is a value normalized such that the sum of the ratios becomes "1."

The information compression unit 40 calculates ratios rG0 and rG135 of the intensity values of the polarization pixels in the green pixel block BG(1,0) and calculates, for each polarization direction, the difference value between each of the ratios rG0 and rG135 and the ratio of the blue pixel block BB(0,0).

A similar process is executed, and the information compression unit 40 calculates the difference value between the intensity value of the normal pixel different from the reference normal pixel and the unpolarized reference intensity value at the equal position in the block and calculates the difference value between the ratio of the intensity value of the polarization pixel in each of two polarization directions and the ratio of the adjacent pixel block. In addition, the information compression unit 40 executes a similar process for the red pixel blocks and the blue pixel blocks.

In the case where the unpolarized reference intensity value has m bits, the information compression unit 40 reduces the bit width of the calculated difference value of the intensity value to n bits (n<m bits). In addition, the ratio of the intensity value in each polarization direction does not significantly vary depending on the color, and the difference value of the ratio is small. The bit width of the difference value of the ratio can be set to a width smaller than m bits or n bits to further reduce the amount of information of the difference information. Therefore, the amount of information (amount of data) of the compressed image information including the reference image information and the difference information can be smaller than the amount of information of the polarized image.

Note that, although FIG. 21 illustrates the case in which the polarization pixels are red, green, and blue, a compression process similar to the process described above can be executed in the case where white polarization pixels are included.

Figure 22:
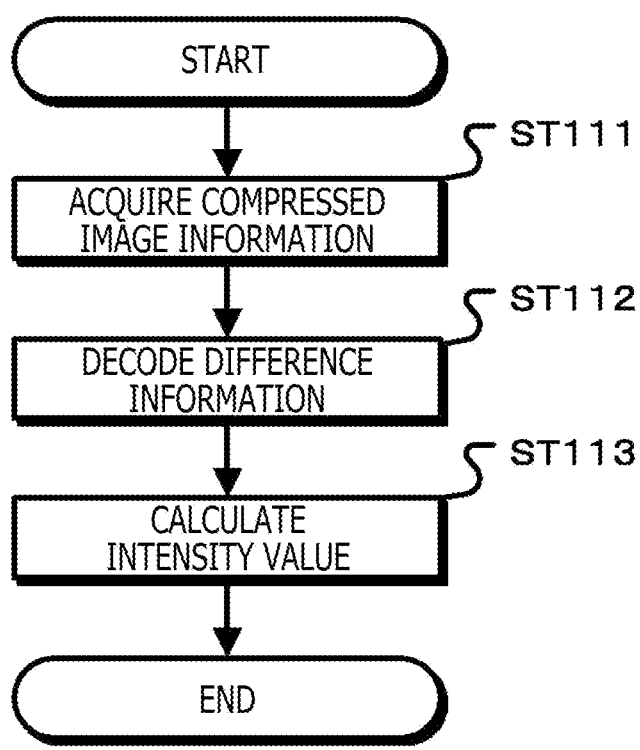
FIG. 22 is a flow chart illustrating the sixth operation of the information decoding unit according to the first configuration.

FIG. 22 is a flow chart illustrating the sixth operation of the information decoding unit according to the first configuration. In step ST111, the information decoding unit acquires the compressed image information. The information decoding unit 70 acquires the compressed image information generated by the information compression unit 40 through the recording medium 50 or the transmission path 60 and proceeds to step ST112.

In step ST112, the information decoding unit decodes the difference information. The information decoding unit 70 adds the difference value of the normal pixel indicated in the difference information and the unpolarized reference intensity value at the position in the block equal to the position of the difference value of the normal pixel to obtain the intensity value of the normal pixel. In addition, the information decoding unit 70 adds, for each polarization direction, the difference value of the ratio indicated in the difference information and the ratio of the adjacent polarization block to decode the ratio of the intensity value of the polarization pixel in the pixel block including the normal pixel for which the intensity value is calculated. The information decoding unit 70 proceeds to step ST113.

In step ST113, the information decoding unit calculates the intensity value. The information decoding unit 70 calculates the intensity value of each of the designated polarization pixels in two polarization directions from the intensity value of the normal pixel obtained in step ST112 and the ratio of the intensity value in each polarization direction. Furthermore, the information decoding unit 70 calculates the intensity value of the subordinate polarization pixel based on the intensity value of the normal pixel and the intensity value of the designated polarization pixel.

According to the sixth operation as described above, the amount of information of the polarized image can efficiently be reduced. In addition, the amount of information (amount of data) can be reduced, and the polarized image can efficiently be delivered. In addition, the characteristic of the polarization that the ratio of the intensity value in each polarization direction does not significantly vary depending on the color is used to generate the difference information, and the amount of information of the difference information can efficiently be reduced. Furthermore, even if the intensity value of the subordinate polarization pixel is not included in the polarized image, the decoding process of the compressed image information can be executed to calculate the intensity value of the subordinate polarization pixel.

<3-7. Seventh Operation of Information Compression Unit and Information Decoding Unit According to First Configuration>

In the sixth operation of the information compression unit, the difference values are calculated for the intensity value and the ratio. In a seventh operation, a predicted value is calculated for each polarization direction based on the intensity value of the normal pixel different from the reference normal pixel and the ratio of the intensity value of the designated polarization pixel in the pixel block adjacent to the pixel block, and the difference value between the intensity value and the predicted value is used as difference information.

That is, the reference image information generated in the seventh operation of the information compression unit includes information indicating the unpolarized reference intensity value that is an intensity value of the reference normal pixel of each color. The difference information includes information indicating the difference between the intensity value of the normal pixel different from the reference normal pixel and the unpolarized reference intensity value of the same color and includes information indicating the difference between the intensity value of the designated polarization pixel in the pixel block including the designated polarization pixel with the polarization direction designated in advance from the combinations of normal pixels different from the reference normal pixels and polarization pixels with the polarization directions that allow to calculate the average intensity value, and the predicted value of the same polarization direction. The predicted value is calculated for each polarization direction based on the intensity value of the normal pixel different from the reference normal pixel and the ratio of the intensity value of the designated polarization pixel in the pixel block adjacent to the pixel block.

Figure 23:
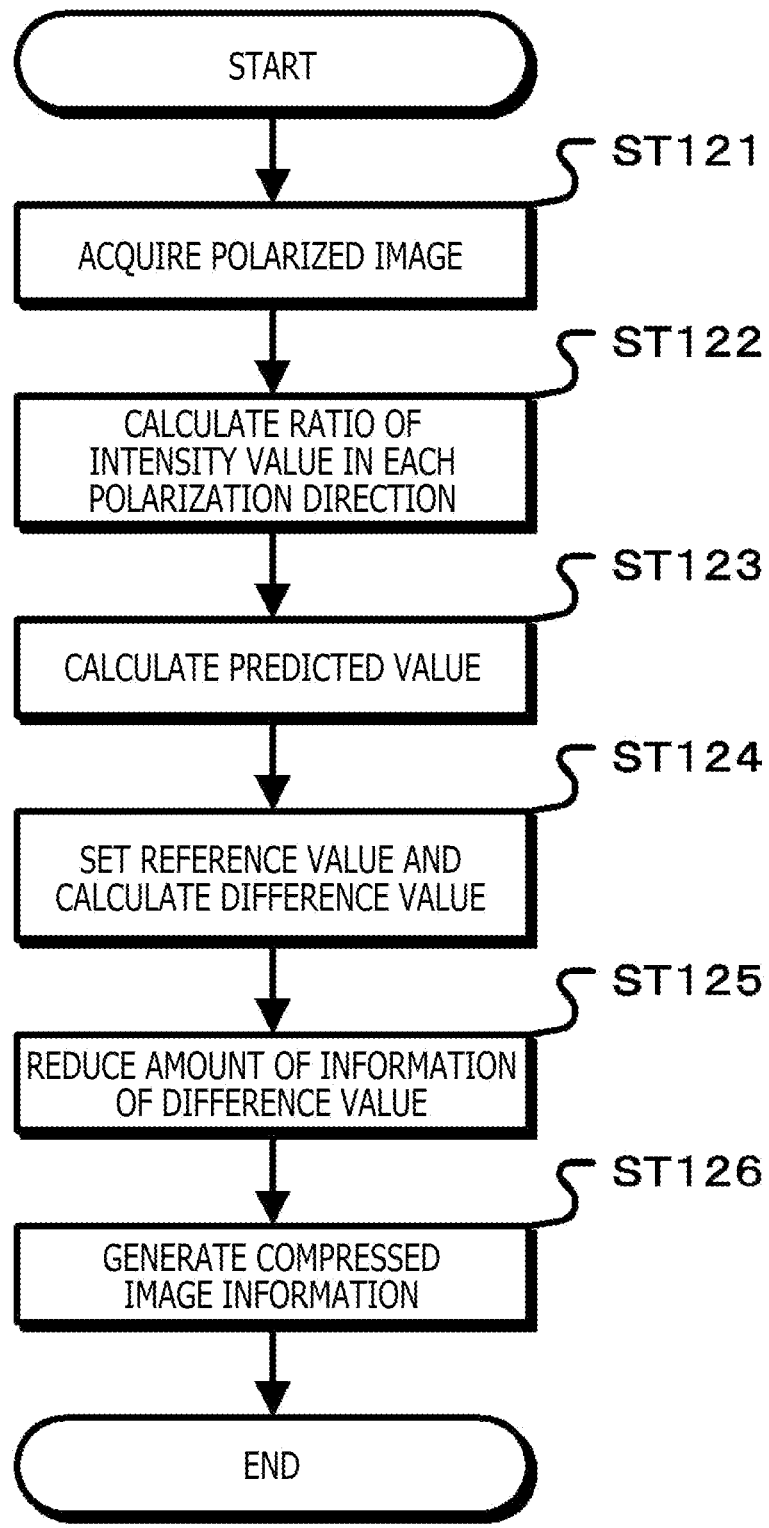
FIG. 23 is a flow chart illustrating a seventh operation of the information compression unit according to the first configuration.

FIG. 23 is a flow chart illustrating the seventh operation of the information compression unit according to the first configuration. In step ST121, the information compression unit acquires the polarized image. The information compression unit 40 acquires the polarized image generated by the polarization imaging unit 20 and proceeds to step ST122.

In step ST122, the information compression unit calculates the ratio of the intensity value in each polarization direction. The information compression unit 40 calculates the ratio of the intensity value in each polarization direction from the intensity value of the polarized image with each polarization direction and proceeds to step ST123.

In step ST123, the information compression unit calculates the predicted value. The information compression unit 40 calculates the predicted value in each polarization direction based on the intensity value of the normal pixel in the pixel block and the ratio of the intensity value in the adjacent pixel block and proceeds to step ST124.

In step ST124, the information compression unit sets the reference value and calculates the difference value. The information compression unit 40 sets the reference normal pixel for each color and sets the intensity value of the reference normal pixel as an unpolarized reference intensity value. Subsequently, the information compression unit 40 calculates the difference value between the intensity value of each of the normal pixels later in the order of pixel than the reference normal pixels and the unpolarized reference intensity value at the same position in the block. In addition, the information compression unit 40 uses the intensity value of the normal pixel, for which the difference value between the intensity value and the unpolarized reference intensity value is calculated, and the ratio of the pixel block adjacent to the pixel block including the normal pixel to calculate the predicted value. Furthermore, the information compression unit 40 calculates, for each polarization direction, the difference value between the intensity value of the polarization pixel in the pixel block and the predicted value and proceeds to step ST125.

In step ST125, the information compression unit reduces the amount of information of the difference value. The information compression unit 40 sets the bit width of the different value to a width smaller than the bit width of the unpolarized reference intensity value and proceeds to step ST126.

In step ST126, the information compression unit generates the compressed image information. The information compression unit 40 sets the reference value set in step ST124 as reference image information and sets the difference value with the amount of information reduced in step ST125 as difference information to generate the compressed image information including the reference image information and the difference information.

Next, the seventh operation of the information compression unit will be described with reference to FIG. 21. For example, the information compression unit 40 sets the normal pixel as a reference normal pixel and sets the intensity value as an unpolarized reference intensity value in the green pixel block BG(0,0) of 2×2 pixels including designated polarization pixels with two different polarization directions and two normal pixels. Subsequently, the information compression unit 40 calculates the difference value between the intensity value of the normal pixel in the green pixel block BG(1,0) and the unpolarized reference intensity value at the equal position in the block.

In addition, the information compression unit 40 calculates the ratio of the intensity value of the polarization pixel in the blue pixel block BB(0,0) adjacent to the green pixel block BG(1,0). For example, the intensity value of the blue polarization pixel with the polarization direction of 0 degrees will be referred to as "IB0," and the intensity value of the blue polarization pixel with the polarization direction of 135 degrees will be referred to as "IB135." In this case, a ratio rB0 of the intensity value of the blue polarization pixel with the polarization direction of 0 degrees is "rB0=IB0/(IB0+IB135)." In addition, the information compression unit 40 calculates a ratio rB135 of the intensity value of the blue polarization pixel with the polarization direction of 135 degrees. Note that the ratio of the intensity value in each polarization direction calculated as described above is a value normalized such that the sum of the ratios becomes "1."

The information compression unit 40 uses an intensity value IGnp of the normal pixel of the green pixel block BG(1,0) and the ratio rB0 of the blue pixel block BB(0,0) to calculate a predicted value IGd0 with the polarization direction of 0 degrees. In this case, the predicted value IGd0 of the polarization pixel with the polarization direction of 0 degrees is "IGd0=IGnp×rB0." Similarly, the information compression unit 40 uses the intensity value IGnp of the normal pixel in the green pixel block BG(1,0) and the ratio rB135 of the adjacent blue pixel block BB(0,0) to calculate a predicted value IGd135 with the polarization direction of 135 degrees. The information compression unit 40 calculates the difference value between the intensity value of the polarization pixel with the polarization direction of 0 degrees in the green pixel block BG(1,0) and the predicated value of the same polarization and calculates the difference value between the intensity value of the polarization pixel with the polarization direction of 135 degrees and the predicted value of the same polarization.

A similar process is executed, and the information compression unit 40 calculates the difference value between the intensity value of the normal pixel different from the reference normal pixel and the unpolarized reference intensity value at the equal position in the block and calculates the difference value between each intensity value of the polarization pixels with two polarization directions and the predicted value. In addition, the information compression unit 40 executes a similar process for the red pixel blocks and the blue pixel blocks.

In the case where the unpolarized reference intensity value has m bits, the information compression unit 40 reduces the bit width of the calculated different value of the intensity value to n bits (n<m bits). In addition, the ratio of the intensity value in each polarization direction does not significantly vary depending on the color, and the difference value between the predicted value calculated by using the ratio and the intensity value is small. The bit width of the difference value between the predicted value and the intensity value can be set to a width smaller than m bits or n bits to further reduce the amount of information of the difference information. Therefore, the amount of information (amount of data) of the compressed image information including the reference image information and the difference information can be smaller than the amount of information of the polarized image.

Note that, although FIG. 21 illustrates the case in which the polarization pixels are red, green, and blue, a compression process similar to the process described above can be executed in the case where white polarization pixels are included.

Figure 24:
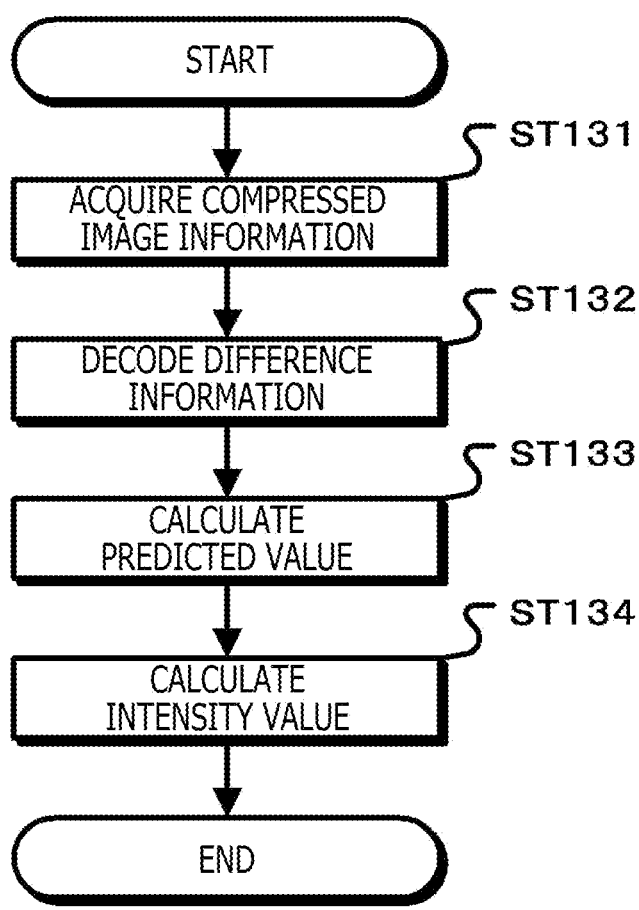
FIG. 24 is a flow chart illustrating the seventh operation of the information decoding unit according to the first configuration.

FIG. 24 is a flow chart illustrating the seventh operation of the information decoding unit according to the first configuration. In step ST131, the information decoding unit acquires the compressed image information. The information decoding unit 70 acquires the compressed image information generated by the information compression unit 40 through the recording medium 50 or the transmission path 60 and proceeds to step ST132.

In step ST132, the information decoding unit decodes the difference information. The information decoding unit 70 adds the difference value of the normal pixel indicated in the difference information and the unpolarized reference intensity value at the position in the block equal to the position of the difference value of the normal pixel to obtain the intensity value of the normal pixel. In addition, the information decoding unit 70 acquires the difference value with respect to the predicted value and proceeds to step ST133.

In step ST133, the information decoding unit calculates the predicted value. The information decoding unit 70 calculates, for each polarization direction, the predicted value from the intensity value of the normal pixel obtained in step ST132 and the ratio of the intensity value of the polarization pixel in the adjacent pixel block and proceeds to step ST134.

In step ST134, the information decoding unit calculates the intensity value. The information decoding unit 70 adds, for each polarization direction, the difference value between the intensity value and the predicted value obtained in step ST132 and the predicted value calculated in step ST133 to calculate each of the intensity values of the designated polarization pixels in two polarization directions in the pixel block. Furthermore, the information decoding unit 70 calculates the intensity value of the subordinate polarization pixel based on the intensity value of the normal pixel and the intensity value of the designated polarization pixel.

According to the seventh operation as described above, the amount of information of the polarized image can efficiently be reduced. In addition, the amount of information (amount of data) can be reduced, and the polarized image can efficiently be delivered. In addition, the characteristic of polarization that the ratio of the intensity value in each polarization direction does not significantly vary depending on the color is used to generate the difference information, and the amount of information of the difference information can efficiently be reduced. Furthermore, even if the intensity value of the subordinate polarization pixel is not included in the polarized image, the decoding process of the compressed image information can be executed to calculate the intensity value of the subordinate polarization pixel.

<4. Second Configuration of Polarized Image Processing System>

Figure 25:
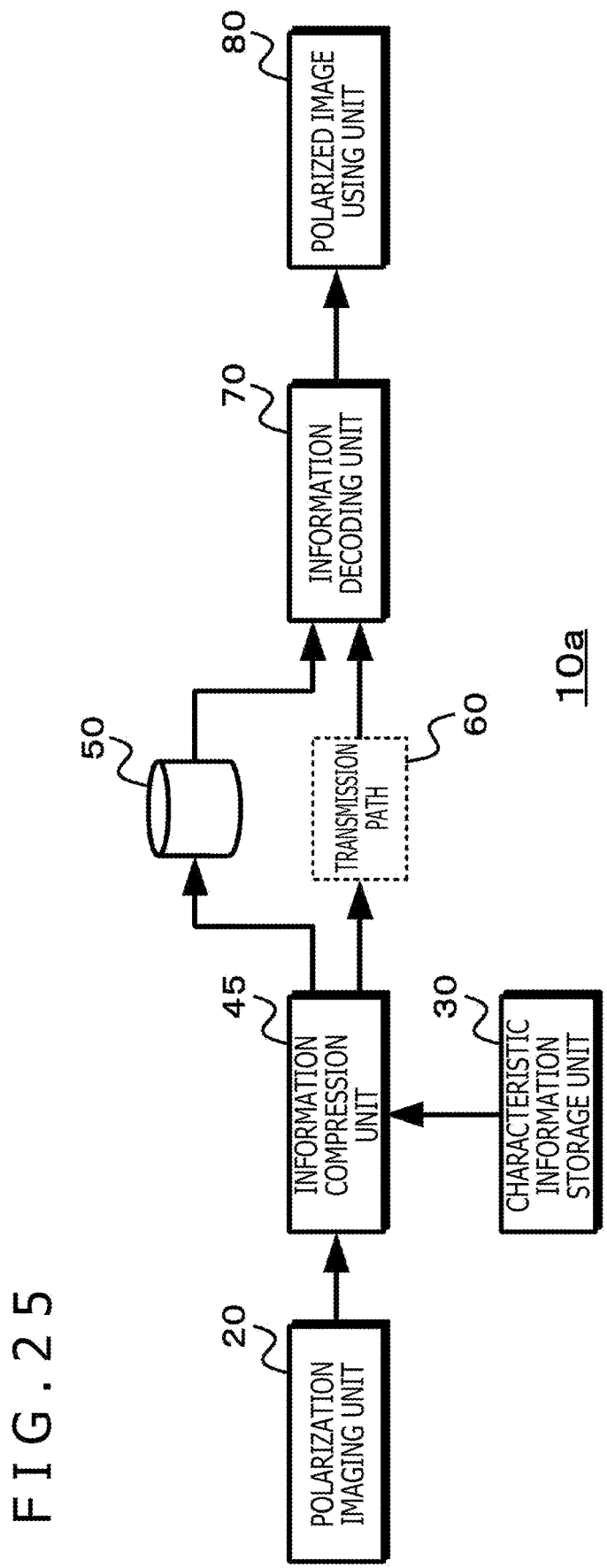
FIG. 25 is a diagram illustrating a second configuration of the polarized image processing system.

FIG. 25 illustrates a second configuration of the polarized image processing system using the image processing apparatus of the present technique. A polarized image processing system 10a includes the polarization imaging unit 20, a characteristic information storage unit 30, and an information compression unit 45. In addition, an information decoding unit 75 and the polarization information using unit 80 may also be provided on the polarized image processing system 10a. The polarized image processing system 10a supplies the compressed polarization information generated by the information compression unit 45 to the information decoding unit 75 through the recording medium 50 or the transmission path 60.

As in the first configuration of the polarized image processing system, the polarization imaging unit 20 acquires a plurality of polarized images with different polarization directions and outputs the polarized images to the information compression unit 45.

The characteristic information storage unit 30 illustrated in FIG. 25 stores characteristic information regarding the acquisition of the polarized images. The characteristic information includes, for example, polarization resolving power information of the polarization imaging unit 20. The polarization resolving power information is information regarding, for example, an extinction ratio or a transmission axis transmittance. In addition, the characteristic information may include pixel arrangement information of the polarization imaging unit 20, that is, information indicating a pattern of arrangement of each color and polarization direction. In addition, the characteristic information may include polarization illumination information indicating the polarization direction of polarization illumination light used for acquiring the polarized image.

Figure 26:
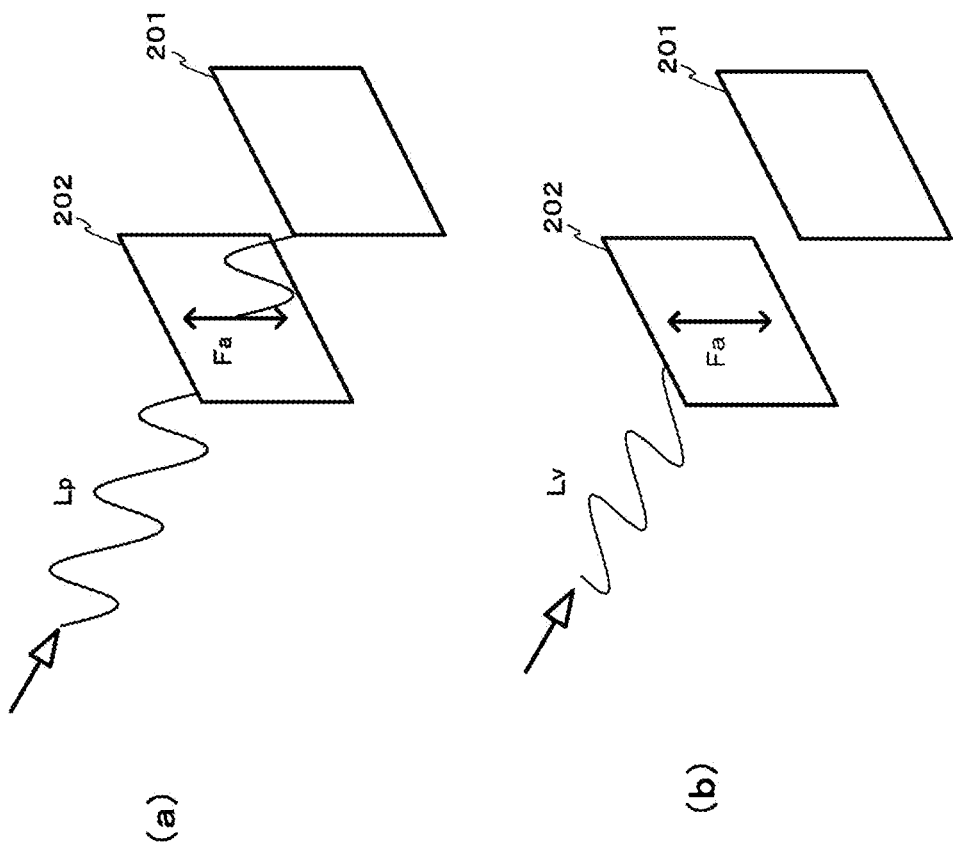
FIG. 26 is a diagram for describing an extinction ratio.

FIG. 26 is a diagram for describing the extinction ratio. The polarization filter 202 is provided for the image sensor 201, and as illustrated in (a) of FIG. 26, an intensity value Ip is an intensity value obtained by the image sensor 201 when completely linearly polarized light Lp parallel to a polarization direction Fa of light transmitted through the polarization filter 202 is applied. Furthermore, as illustrated in (b) of FIG. 26, an intensity value Iv is an intensity value obtained by the image sensor 201 when completely linearly polarized light Lv perpendicular to the polarization direction Fa of the light transmitted through the polarization filter 202 is applied. A ratio "Ip:Iv" of the intensity value Ip and the intensity value Iv is called an extinction ratio. Although an ideal extinction ratio is "Ip:Iv=1:0," there is some degradation in an actual device. Therefore, the extinction ratio is represented by "Er:1," and a value Er is included as information regarding the extinction ratio in the characteristic information. Note that Er is 100 to 10000 in a general polarization plate.

Figure 27:
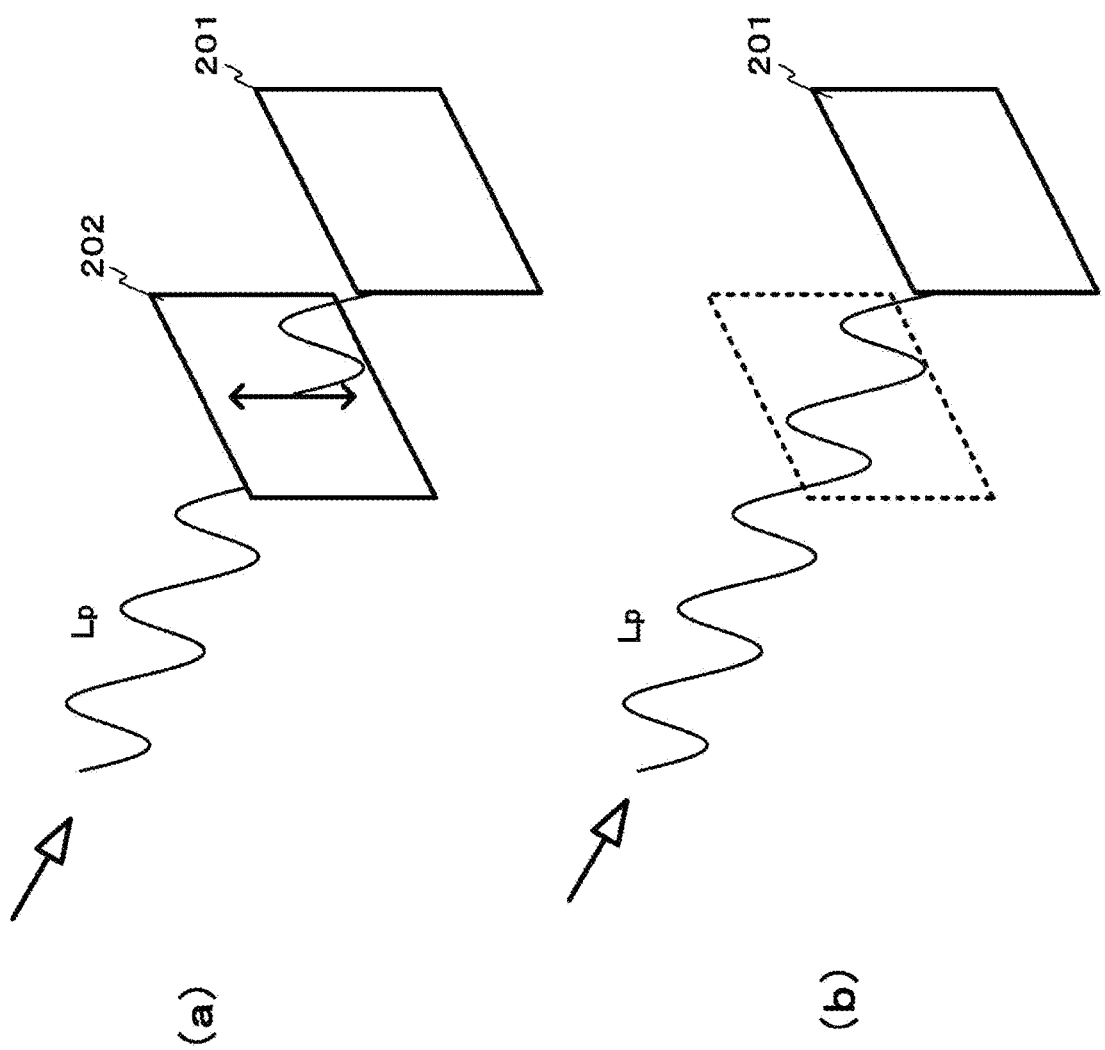
FIG. 27 is a diagram for describing a transmission axis transmittance.

FIG. 27 is a diagram for describing the transmission axis transmittance. The polarization filter 202 is provided for the image sensor 201, and as illustrated in (a) of FIG. 27, an intensity value Is is an intensity value obtained by the image sensor 201 when the completely linearly polarized light Lp parallel to the polarization direction Fa of the light transmitted through the polarization filter 202 is applied. In addition, an intensity value Iq is an intensity value obtained by the image sensor 201 when the completely linearly polarized light Lp is applied to the image sensor 201 not provided with the polarization filter 202 as illustrated in (b) of FIG. 27. A ratio "Et=Is/Iq" of the intensity value Is and the intensity value Iq is called a transmission axis transmittance. The transmission axis transmittance is an index representing how much the sensitivity has dropped after providing the polarization element, and the transmission axis transmittance Et is included in the characteristic information. Note that an ideal transmission axis transmittance is "Et=1."

The information compression unit 45 executes a compression process of the polarized image acquired by the polarization imaging unit 20. The information compression unit 45 uses the characteristic information stored in the characteristic information storage unit 30 to execute the compression process of the polarized image to generate compressed image information. The information compression unit 45 outputs the generated compressed image information to the information decoding unit 75 through the recording medium 50 or the transmission path 60.

The information decoding unit 75 executes a decoding process corresponding to the compression process of the information compression unit 45 and generates the polarized image before the compression process from the compressed image information acquired through the recording medium 50 or the transmission path 60. The information decoding unit 75 outputs the generated polarized image to the polarization information using unit 80.

The polarization information using unit 80 performs detection of the normal direction of the object, detection of the reflection components, and the like based on the polarized image generated by the information decoding unit 75 and performs generation of a highly accurate depth map, an object recognition process, removal of specular reflection components, generation of a VR (Virtual Reality) environment, and the like.

<5. Compression Process and Decoding Process According to Second Configuration>

Next, the compression process executed by the information compression unit 45 and the decoding process executed by the information decoding unit will be described. The information compression unit 45 uses the characteristic information stored in the characteristic information storage unit 30 to execute the compression process. In addition, the information decoding unit 75 executes the decoding process corresponding to the compression process used by the information compression unit 45. Note that the processes executed by the information compression unit 45 and the information decoding unit 75 may be either lossless compression or lossy compression.

<5-1. First Operation of Information Compression Unit According to Second Configuration>

In a first operation of the information compression unit 45, the compression process is executed by using, for example, the extinction ratio and the transmission axis transmittance.

The information compression unit 45 acquires the polarized image from the polarization imaging unit 20 and acquires the extinction ratio and the transmission axis transmittance from the characteristic information storage unit 30 to correct the intensity value of the polarized image based on the extinction ratio and the transmission axis transmittance. Furthermore, the information compression unit 45 uses the polarized image with the corrected intensity value to execute a process similar to the information compression unit 40 described above and generates the compressed image information.

Here, "Iv" represents the observed intensity value, "Ip" represents the ideal intensity value, Er represents the extinction ratio, and Et represents the transmission axis transmittance. In the case where the polarization direction is 0 degrees, Equation (9) holds. Furthermore, in the cases where the polarization directions are 45 degrees, 90 degrees, and 135 degrees, Equations (10), (11), and (12) hold, respectively.

[Math. 3]

$$Iv_0 = EtIp_0 + \frac{Et}{Er}Ip_{90} \quad (9)$$

-continued $$Iv_{45} = EtIp_{45} + \frac{Et}{Er}Ip_{135} \quad (10)$$

$$Iv_{90} = EtIp_{90} + \frac{Et}{Er}Ip_0 \quad (11)$$

$$Iv_{135} = EtIp_{135} + \frac{Et}{Er}Ip_{45} \quad (12)$$

Furthermore, in the case where normal pixels are provided, Equations (13) and (14) hold in the cases where the polarization directions are 0 degrees and 45 degrees, and an observed intensity value Inpv is in the relation of Equation (15), where Inpv represents the observed intensity value of a normal pixel.

[Math. 4]

$$Iv_0 = EtIp_0 + \frac{Et}{Er}Ip_{90} \quad (13)$$

$$Iv_{135} = EtIp_{135} + \frac{Et}{Er}Ip_{45} \quad (14)$$

$$Inpv = Ip_0 + Ip_{90} = Ip_{45} + Ip_{135} \quad (15)$$

Therefore, the information compression unit 45 can use the extinction ratio and the transmission axis transmittance stored in the characteristic information storage unit 30 to correct the intensity value of the polarized image acquired by the polarization imaging unit 20 to an ideal intensity value.

In this way, the polarized image can be corrected based on the characteristic information to remove an influence of the difference in characteristics of the polarization imaging unit 20, and a highly accurate compression process of the polarized image can be executed.

<5-2. Second Operation of Information Compression Unit According to Second Configuration>

Next, a case in which polarization information of light is stored in the characteristic information storage unit will be described. In this case, it is desirable that the information compression unit 45 use the polarized image including polarization pixels and normal pixels illustrated in the fifth to seventh operations of the information compression unit described above. Note that the application of the polarization light is used for inspection in the body, inspection of an object, or the like, while the user controls a light source state in using an endoscope, in using the light in a factory, or the like.

In the case where the completely linearly polarized polarization illumination light is used, the relation between the polarization pixel with the polarization direction parallel to the polarization illumination light and the intensity value of the normal pixel is indicated by the transmission axis transmittance. Therefore, the intensity value of the polarization pixel can be adjusted according to the transmission axis transmittance to make the intensity value of the polarization pixel with the polarization direction parallel to the polarization illumination light similar to the intensity value of the normal pixel. Therefore, only the reference value and the difference value regarding either one of the adjacent polarization pixel with the polarization direction parallel to the polarization illumination light or the normal pixel are used for the compressed image information, and in decoding, the reference value and the difference value regarding one of the pixels is used as the reference value and the difference value regarding the other pixel to thereby improve the compression efficiency.

Figure 28:
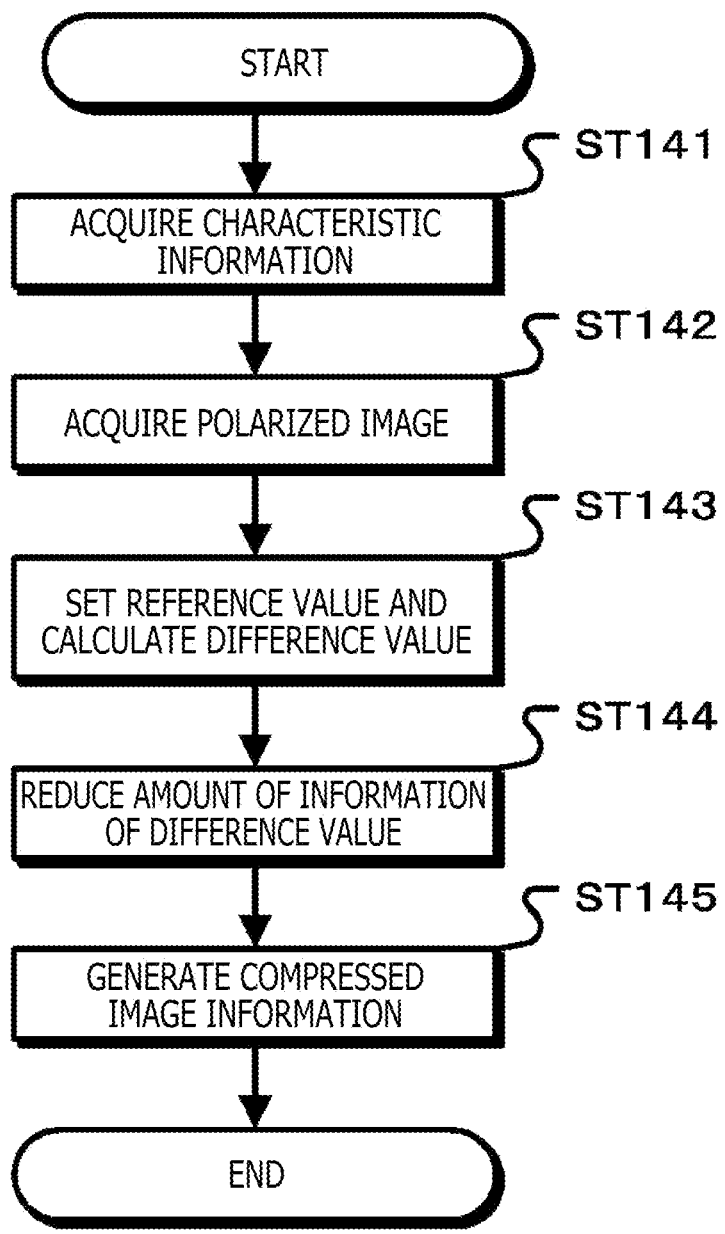
FIG. 28 is a flow chart illustrating a second operation of the information compression unit according to the second configuration.

FIG. 28 is a flow chart illustrating a second operation of the information compression unit according to the second configuration. Note that, to facilitate the description, it is assumed that the transmission axis transmittance is "ET=1," and the intensity value of the polarization pixel with the polarization direction parallel to the polarization illumination light and the intensity value of the normal pixel are equal to each other. In addition, the following description illustrates a case in which the polarization pixel is used as either one of the polarization pixel with the polarization direction parallel to the polarization illumination light or the normal pixel.

In step ST141, the information compression unit acquires the characteristic information. The information compression unit 45 acquires the polarization illumination information from the characteristic information storage unit 30 and proceeds to step ST142.

In step ST142, the information compression unit acquires the polarized image. The information compression unit 45 acquires the polarized image generated by the polarization imaging unit 20 and proceeds to step ST143.

In step ST143, the information compression unit sets the reference value and calculates the difference value. The information compression unit 45 sets the reference polarization pixel for each pixel of the same color and the same polarization in the polarized image and sets the intensity value of the reference polarization pixel as a reference intensity value. In addition, the information compression unit 40 calculates the difference value between the intensity value of each of the polarization pixels later in the order of pixel than the reference polarization pixels and the reference intensity value of the same color and the same polarization and proceeds to step ST144.

In step ST144, the information compression unit reduces the amount of information of the difference value. The information compression unit 40 sets the bit width of the difference value to a width smaller than the bit width of the reference intensity value and proceeds to step ST145.

In step ST145, the information compression unit generates the compressed image information. The information compression unit 40 sets the reference value set in step ST143 as reference image information and sets the difference value with the amount of information reduced in step ST144 as difference information to generate the compressed image information including the reference image information and the difference information.

FIG. 29 is a diagram for describing the second operation of the information compression unit according to the second configuration. Note that (a) of FIG. 29 illustrates a case in which the polarized image acquired by the polarization imaging unit is a black and white polarized image, and (b) of FIG. 29 illustrates a case in which the polarized image acquired by the polarization imaging unit is a color polarized image.

In (a) of FIG. 29, a polarization pixel P(0,0) is the first pixel with the polarization direction of 0 degrees, and the information compression unit 40 sets the polarization pixel P(0,0) as a reference polarization pixel and sets the intensity value as a reference intensity value. Next, the intensity value of the polarization pixel with the polarization direction parallel to the polarization illumination light and the intensity value of the normal pixel are equal to each other, and the information compression unit 40 skips a normal pixel P(1,0). Note that, in FIG. 29, the pixels to be skipped are indicated by "SK."

A polarization pixel P(2,0) is the second pixel with the polarization direction of 0 degrees, and the information compression unit 40 calculates the difference value between the intensity value of the polarization pixel P(2,0) and the reference intensity value of the same polarization. In addition, the information compression unit 40 skips a normal pixel P(3,0). Similarly, the normal pixels are skipped, and for each pixel of the first line, the information compression unit 40 sets the intensity value of the reference polarization pixel as a reference intensity value and calculates the difference value between the intensity value of the polarization pixel different from the reference polarization pixel and the reference intensity value of the same polarization.

Next, a polarization pixel P(1,1) is the first pixel with the polarization direction of 135 degrees, and the information compression unit 40 sets the polarization pixel P(1,1) as a reference polarization pixel and sets the intensity value as a reference intensity value. For each of the later polarization pixels in the horizontal direction, the information compression unit 40 calculates the difference value between the intensity value of the polarization pixel and the reference intensity value of the same polarization.

Similarly, the information compression unit 40 calculates the difference values, and in a case where the intensity value of each of the reference polarization pixels with two polarization directions has m bits, the information compression unit 40 reduces the bit width of the difference value to n bits (n<m bits) to reduce the amount of information of the difference information. Therefore, the amount of information (amount of data) of the compressed image information including the reference image information and the difference information can be smaller than the amount of information of the polarized image. Note that, in the process described above, the information compression unit 40 may set the reference value and calculate the difference value for the normal pixel and may skip the polarization pixel with the polarization direction parallel to the polarization illumination light. The information regarding the intensity value of the normal pixel (or the polarization pixel with the polarization direction parallel to the polarization illumination light) is not included in the compressed image information, and the amount of information can efficiently be reduced.

Furthermore, in the case of (b) in FIG. 29, the process described with reference to (a) of FIG. 29 is executed for each color. For example, the information compression unit 40 sets two polarization pixels (for example, polarization pixels with the polarization directions of 0 degrees and 135 degrees) of a green pixel block BG(0,0) of 2×2 pixels as reference polarization pixels and sets the intensity values as reference intensity values. In addition, the information compression unit 40 sets two normal pixels of the green pixel block BG(0,0) as reference normal pixels and sets the intensity values as reference intensity values. Subsequently, the information compression unit 40 calculates the difference value between the intensity value of the polarization pixel and the reference intensity value of the same polarization for each of green pixel blocks BG(1,0), BG(1,0), BG(0,1), and BG(1,1). In addition, the information compression unit 40 skips the normal pixels in the green pixel blocks. Similarly, the information compression unit 40 sets the reference value and calculates the difference value for each of the green polarization pixels, the red polarization pixels, and the blue polarization pixels. Note that "SK" indicating the pixel to be skipped is not displayed for the red polarization pixels and the blue polarization pixels.

In the case where the reference intensity value as an intensity value of the reference polarization pixel has m bits, the information compression unit 40 reduces the bit width of the difference value to n bits (n<m bits) to reduce the amount of information of the difference information. Therefore, the amount of information (amount of data) of the compressed image information including the reference image information and the difference information can be smaller than the amount of information of the color polarized image. Note that, in the process described above, the information compression unit 40 may set the reference value and calculate the difference value for the normal pixel and may skip the polarization pixel with the polarization direction parallel to the polarization illumination light. The information regarding the intensity value of the normal pixel (or the polarization pixel with the polarization direction parallel to the polarization illumination light) is not included in the compressed image information, and the amount of information can efficiently be reduced.

Figure 30:
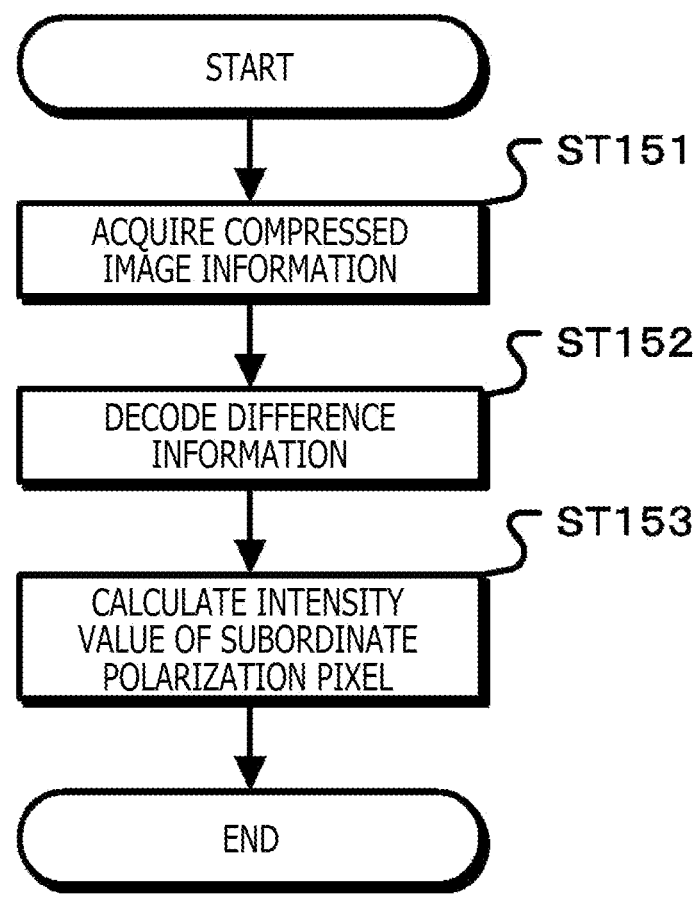
FIG. 30 is a flow chart illustrating an operation of the information decoding unit according to the second configuration.

FIG. 30 is a flow chart illustrating an operation of the information decoding unit according to the second configuration. Note that FIG. 30 illustrates a decoding process of the compressed image information generated in the process of FIG. 28.

In step ST151, the information decoding unit acquires the compressed image information. The information decoding unit 70 acquires the compressed image information by the information compression unit 45 through the recording medium 50 or the transmission path 60 and proceeds to step ST152.

In step ST152, the information decoding unit decodes the difference information. The information decoding unit 70 adds the difference value of the polarization pixel indicated in the difference information and the reference intensity value of the same color and the same polarization as the difference value to decode the intensity value of the polarization pixel. In addition, the information decoding unit 70 sets the intensity value of the polarization pixel with the polarization direction parallel to the polarization illumination light as an intensity value of the adjacent normal pixel and proceeds to step ST153.

In step ST153, the information decoding unit calculates the intensity value of the subordinate polarization pixel. The information decoding unit 70 calculates the intensity value of the subordinate polarization pixel based on the intensity values of the normal pixel and the polarization pixel obtained in step ST152. That is, for each image block of 2×2 pixels, the information decoding unit 70 calculates the intensity values I45 and I90 with the polarization directions of 45 degrees and 90 degrees from the intensity value Inp of the normal pixel, the intensity value I0 of the polarization pixel with the polarization direction of 0 degrees, and the intensity value I135 of the polarization pixel with the polarization direction of 135 degrees based on the relation of Equation (6) above.

Incidentally, in the case where the transmission axis transmittance is not "Et=1," the intensity value of the polarization pixel with the polarization direction parallel to the polarization illumination light and the intensity value of the normal pixel are different. However, the intensity value of the polarization pixel with the polarization direction parallel to the polarization illumination light can be adjusted to the intensity value of the normal pixel based on the transmission axis transmittance Et. Therefore, in the case where the intensity value is adjusted, adjustment information indicating an adjustment rate or the like is included in the compressed image information. In addition, it is only necessary that the information decoding unit 70 puts the intensity value of the polarization pixel with the polarization direction parallel to the polarization illumination light back to the intensity value before the adjustment based on the adjustment information.

According to the second operation of the second configuration as described above, the amount of information of the polarized image can efficiently be reduced even if the normal pixels are included in the polarized image. In addition, since the amount of information (amount of data) can be reduced, the polarized image can efficiently be delivered. In addition, the characteristic information can be used to further improve the compression efficiency.

<6. Another Operation of Compression Process>

Incidentally, in the operation of setting the first pixel of each color and each polarization direction as a reference polarization pixel in the operation described above, the reference intensity value to be used for calculating the difference value may be the pixel value of the pixel of the same color and the same polarization for which the difference value is calculated last time. For example, in the case where the first pixel is set as the reference pixel, and the difference value is calculated for a later polarization pixel of the same color and the same polarization, the pixel value of the polarization pixel for which the difference value is calculated is set as a reference intensity value in the calculation of the next difference value. The reference intensity value can be updated in this way to calculate the difference value between the polarization pixels of the same color and the same polarization in the vicinity, and this can prevent the difference value from being large due to a large distance from the reference pixel that is set first. Note that, in the case of updating the reference intensity value in this way, the first reference intensity value and difference value can be used to sequentially decode the pixel values of the polarization pixels, and therefore, it is only necessary that only the first reference intensity value is included in the reference image information. In addition, the reference average intensity value and the unpolarized reference intensity value may be similarly updated, and only the first reference average intensity value and unpolarized reference intensity value may be included in the reference image information. In addition, the reference polarization pixel and the reference normal pixel may be set for each predetermined area or for each area based on a recognition result of an object.

In addition, the operation of the information compression unit is not limited to the orders of processing in the flow charts. For example, when the process of the next step can be executed before the completion of the process of one step for the polarized image in the flow chart, the process of the next step may be executed before the completion of the process of the one step for the polarized image.

In addition, advantageous effects described in the present specification are illustrative only, and the advantageous effects are not limited. There may be additional advantageous effects.

<7. Application Examples>

The technique according to the present disclosure can be applied to various fields. For example, the technique according to the present disclosure may also be realized as an apparatus mounted on any type of moving body, such as a car, an electric car, a hybrid electric car, a motorcycle, a bicycle, a personal mobility, an airplane, a drone, a ship, and a robot. In addition, the technique may be realized as a device used in a production process in a factory or as an apparatus mounted on a device used in the construction field. The technique can be applied to such a field to accurately perform generation of normal information, separation of reflection components, and the like based on the polarization information. Therefore, a surrounding environment can be three-dimensionally and accurately figured out, and fatigue of a driver or a worker can be reduced. In addition, automatic driving and the like can be more safely performed.

The technique according to the present disclosure can also be applied to the medical field. For example, the technique can be applied to a case of using a captured image of a surgery site in conducting a surgery, and a three-dimensional shape of the surgery site or an image without reflection can accurately be obtained. This can reduce fatigue of an operator, and the surgery can safely and more surely be conducted.

Furthermore, the amount of data of the polarization information can be reduced and transmitted, and this facilitates to three-dimensionally check the surrounding environment or the surgery site even at a remote location. In addition, the polarization information can efficiently be recorded.

The series of processes described in the specification can be executed by hardware, software, or a composite configuration of the hardware and the software. In the case where the software executes the processes, the processes are executed by installing a program recording the processing sequences on a memory in a computer incorporated into dedicated hardware. Alternatively, the processes can be executed by installing the program on a general-purpose computer that can execute various processes.

For example, the program can be recorded in advance in a hard disk, an SSD (Solid State Drive), or a ROM (Read Only Memory) as a recording medium. Alternatively, the program can be temporarily or permanently stored (recorded) in a removable recording medium, such as a flexible disk, a CD-ROM (Compact Disc Read Only Memory), an MO (Magneto optical) disk, a DVD (Digital Versatile Disc), a BD (Blu-Ray Disc (registered trademark)), a magnetic disk, and a semiconductor memory card. The removable recording medium can be provided as what is called packaged software.

Furthermore, other than installing the program on the computer from the removable recording medium, wireless or wired communication may be used to transfer the program from a download site to a computer through a network such as a LAN (Local Area Network) and the Internet. The computer can receive the program transferred in this way and install the program on a recording medium such as a built-in hard disk.

Note that the advantageous effects described in the present specification are illustrative only, and the advantageous effects are not limited. There may also be advantageous effects not described in the present specification. In addition, the present technique should not be construed as being limited to the embodiment of the technique described above. The embodiment of the technique discloses the present technique in a form of an example, and it is apparent that those skilled in the art can modify or substitute the embodiment without departing from the scope of the present technique. That is, the claims should be taken into account to determine the scope of the present technique.

In addition, the image processing apparatus of the present technique can also be configured as follows.

(1)

An image processing apparatus including:

an information compression unit that generates compressed image information by reducing an amount of information of polarized image information of each of polarization pixels with at least a plurality of polarization directions in a polarized image including polarization pixels with a plurality of polarization directions.

(2) The information processing apparatus according to (1), in which the information compression unit sets reference image information based on polarized image information of a reference polarization pixel in the polarized image, generates difference information between polarized image information of each polarization pixel different from the reference polarization pixel in the polarized image and the reference image information, and reduces an amount of information of the difference information generated for each polarization pixel to generate the compressed image information including the reference image information and the difference information with the reduced amount of information.

(3) The image processing apparatus according to (2), in which the reference image information includes information indicating an intensity value of the reference polarization pixel of each color and each polarization direction, and the difference information includes information indicating a difference between the intensity value of the reference polarization pixel and an intensity value of a polarization pixel of the same color and the same polarization direction different from the reference polarization pixel.

(4) The image processing apparatus according to (2), in which the information compression unit generates the reference image information and the difference information based on a nature of polarization.

(5) The image processing apparatus according to (4), in which the reference image information includes information indicating a reference average intensity value calculated for each color by using intensity values of reference polarization pixels with a plurality of polarization directions and includes information indicating a reference intensity value that is an intensity value of the reference polarization pixel with a polarization direction designated in advance from combinations of polarization pixels with polarization directions that allow to calculate an average intensity value, and the difference information includes information indicating a difference between an average intensity value, which is calculated for each color by using intensity values of polarization pixels different from the reference polarization pixels, and the reference average intensity value of the same color and includes information indicating a difference between the intensity value of the polarization pixel different from the reference polarization pixel and the reference intensity value of the same color and the same polarization direction.

(6) The image processing apparatus according to (4), in which the reference image information includes information indicating a reference average intensity value calculated for each color by using intensity values of reference polarization pixels with a plurality of polarization directions, and the difference information includes information indicating a difference between an average intensity value, which is calculated for each color by using intensity values of polarization pixels with a plurality of polarization directions different from the reference polarization pixels, and the reference average intensity value of the same color and includes information indicating a difference between a ratio of an intensity value in a pixel block of the polarization pixels different from the reference polarization pixels and a ratio of an intensity value of polarization pixels in an adjacent pixel block.

(7) The image processing apparatus according to (4), in which the reference image information includes information indicating a reference average intensity value calculated for each color by using intensity values of reference polarization pixels with a plurality of polarization directions, the difference information includes information indicating a difference between an average intensity value, which is calculated for each color by using intensity values of polarization pixels with a plurality of polarization directions different from the reference polarization pixels, and the reference average intensity value of the same color and includes information indicating a difference between each of the intensity values of the polarization pixels with the plurality of polarization directions different from the reference polarization pixels and a predicted value of the same polarization direction, and the predicted value is calculated for each polarization direction based on the average intensity value calculated in a pixel block of the polarization pixels different from the reference polarization pixels and based on a ratio of an intensity value of each polarization pixel in a pixel block adjacent to the pixel block.

(8) The image processing apparatus according to (4), in which the polarized image includes an unpolarized normal pixel, the reference image information includes information indicating an unpolarized reference intensity value that is an intensity value of a reference normal pixel of each color and includes information indicating a reference intensity value that is an intensity value of a reference polarization pixel with a polarization direction designated in advance from combinations of polarization pixels with polarization directions that allow to calculate the average intensity value, and the difference information includes information indicating a difference between an intensity value of a normal pixel different from the reference normal pixel and an unpolarized reference intensity value of the same color and includes information indicating a difference between an intensity value of a polarization pixel with the same polarization direction that is a polarization pixel different from the reference polarization pixel and a reference intensity value with the same polarization direction.

(9) The image processing apparatus according to (4), in which the polarized image includes an unpolarized normal pixel, the reference image information includes information indicating an unpolarized reference intensity value that is an intensity value of a reference normal pixel of each color, and the difference information includes information indicating a difference between an intensity value of a normal pixel different from the reference normal pixel and an unpolarized reference intensity value of the same color and includes information indicating a difference between a ratio of an intensity value of a designated polarization pixel in a pixel block, which includes the designated polarization pixel with a polarization direction designated in advance from combinations of normal pixels different from the reference normal pixels and polarization pixels with polarization directions that allow to calculate an average intensity value, and a ratio of an intensity value of the designated polarization pixel in an adjacent pixel block.

(10)

The information processing apparatus according to (4), in which the polarized image includes an unpolarized normal pixel, the reference image information includes information indicating an unpolarized reference intensity value that is an intensity value of a reference normal pixel of each color, the difference information includes information indicating a difference between an intensity value of a normal pixel different from the reference normal pixel and an unpolarized reference intensity value of the same color and includes information indicating a difference between an intensity value of a designated polarization pixel in a pixel block, which includes the designated polarization pixel with a polarization direction designated in advance from combinations of normal pixels different from the reference normal pixels and polarization pixels with polarization directions that allow to calculate an average intensity value, and a predicted value of the same polarization direction, and the predicted value is calculated for each polarization direction based on a ratio of the intensity value of the normal pixel different from the reference normal pixel and an intensity value of the designated polarization pixel in a pixel block adjacent to the pixel block.

(11)

The image processing apparatus according to any of (2) to (10), further including:

a characteristic information storage unit that stores characteristic information regarding acquisition of the polarized image including the polarization pixels with the plurality of polarization directions, in which the information compression unit uses the characteristic information stored in the characteristic information storage unit to generate the compressed image information.

(12)

The image processing apparatus according to (11), in which the characteristic information indicates an extinction ratio or a transmission axis transmittance of a polarization imaging unit that has acquired the polarized image, and the information compression unit uses the extinction ratio or the transmission axis transmittance to correct the polarized image and uses the polarized image after the correction to generate the compressed image information.

(13)

The image processing apparatus according to (11) or (12), in which the characteristic information indicates a polarization direction of polarization illumination light used to acquire the polarized image, and the information compression unit generates the reference image information and the difference information based on the polarization direction of the polarization illumination light.

(14)

The image processing apparatus according to any of (2) to (13), in which the information compression unit sets a bit width of the difference information to a width smaller than a bit width of the reference image information to reduce the amount of information of the difference information.

REFERENCE SIGNS LIST 10, 10a: Polarized image processing system
20: Polarization imaging unit
30: Characteristic information storage unit
40, 45: Information compression unit
50: Recording medium
60: Transmission path
70, 75: Information decoding unit
80: Polarization information using unit
201: Image sensor
202: Polarization filter
203: Color filter

The invention claimed is:

1. An image processing apparatus comprising:
an information compression unit configured to generate compressed image information by reducing an amount of information of polarized image information of each of polarization pixels with at least a plurality of polarization directions in a polarized image including polarization pixels with a plurality of polarization directions,
wherein the amount of information of the polarized image information is reduced by encoding difference information indicating a difference between a reference intensity value of a reference polarization pixel for a respective color and an intensity value of at least one other polarization pixel of the respective color, and
wherein the information compression unit is implemented via at least one processor.

2. The information processing apparatus according to claim 1, wherein
the information compression unit is further configured to
set reference image information based on polarized image information of the reference polarization pixel in the polarized image,
generate the difference information between polarized image information of each polarization pixel different from the reference polarization pixel in the polarized image and the reference image information, and
reduce an amount of information of the difference information generated for each polarization pixel to generate the compressed image information including the reference image information and the difference information with the reduced amount of information.

3. The image processing apparatus according to claim 2, wherein
the reference image information includes information indicating the reference intensity value of the reference polarization pixel for each color and each polarization direction, and
the difference information includes information indicating a difference between the intensity value of the reference polarization pixel for each respective color and an intensity value of a polarization pixel of the respective color and a polarization direction different from the reference polarization pixel.

4. The image processing apparatus according to claim 2, wherein
the information compression unit generates the reference image information and the difference information based on a combination of polarization pixels to calculate the reference intensity value.

5. The image processing apparatus according to claim 4, wherein
the reference image information includes information indicating a reference average intensity value calculated for each color by using intensity values of reference polarization pixels with a plurality of polarization directions and includes information indicating a reference intensity value that is an intensity value of the reference polarization pixel with a polarization direction designated in advance from combinations of polarization pixels with polarization directions that allow to calculate an average intensity value, and
the difference information includes information indicating a difference between an average intensity value, which is calculated for each color by using intensity values of polarization pixels different from the reference polarization pixels, and the reference average intensity value of a same color and includes information indicating a difference between the intensity value of the polarization pixel different from the reference polarization pixel and the reference intensity value of a same color and a same polarization direction.

6. The image processing apparatus according to claim 4, wherein
the reference image information includes information indicating a reference average intensity value calculated for each color by using intensity values of reference polarization pixels with a plurality of polarization directions, and
the difference information includes information indicating a difference between an average intensity value, which is calculated for each color by using intensity values of polarization pixels with a plurality of polarization directions different from the reference polarization pixels, and the reference average intensity value of a same color and includes information indicating a difference between a ratio indicating intensity values in a pixel block of the polarization pixels different from the reference polarization pixels and a ratio indicating intensity values of polarization pixels in an adjacent pixel block.

7. The image processing apparatus according to claim 4, wherein
the reference image information includes information indicating a reference average intensity value calculated for each color by using intensity values of reference polarization pixels with a plurality of polarization directions,
the difference information includes information indicating a difference between an average intensity value, which is calculated for each color by using intensity values of polarization pixels with a plurality of polarization directions different from the reference polarization pixels, and the reference average intensity value of a same color and includes information indicating a difference between each of the intensity values of the polarization pixels with the plurality of polarization directions different from the reference polarization pixels and a predicted value of a same polarization direction, and
the predicted value is calculated for each polarization direction based on the average intensity value calculated in a pixel block of the polarization pixels different from the reference polarization pixels and based on a ratio indicating intensity values of each polarization pixel in a pixel block adjacent to the pixel block.

8. The image processing apparatus according to claim 4, wherein
the polarized image includes an unpolarized normal pixel,
the reference image information includes information indicating an unpolarized reference intensity value that is an intensity value of a reference normal pixel of each color and includes information indicating a reference intensity value that is an intensity value of a reference polarization pixel with a polarization direction designated in advance from combinations of polarization pixels with polarization directions that allow to calculate the average intensity value, and
the difference information includes information indicating a difference between an intensity value of a normal pixel different from the reference normal pixel and an unpolarized reference intensity value of a same color and includes information indicating a difference between an intensity value of a polarization pixel with a same polarization direction that is a polarization pixel different from the reference polarization pixel and a reference intensity value with the same polarization direction.

9. The image processing apparatus according to claim 4, wherein
the polarized image includes an unpolarized normal pixel,
the reference image information includes information indicating an unpolarized reference intensity value that is an intensity value of a reference normal pixel of each color, and
the difference information includes information indicating a difference between an intensity value of a normal pixel different from the reference normal pixel and an unpolarized reference intensity value of a same color and includes information indicating a difference between a ratio indicating intensity values of a designated polarization pixel in a pixel block, which includes the designated polarization pixel with a polarization direction designated in advance from combinations of normal pixels different from the reference normal pixels and polarization pixels with polarization directions that allow to calculate an average intensity value, and a ratio indicating intensity values of the designated polarization pixel in an adjacent pixel block.

10. The information processing apparatus according to claim 4, wherein
the polarized image includes an unpolarized normal pixel,
the reference image information includes information indicating an unpolarized reference intensity value that is an intensity value of a reference normal pixel of each color,
the difference information includes information indicating a difference between an intensity value of a normal pixel different from the reference normal pixel and an unpolarized reference intensity value of a same color and includes information indicating a difference between an intensity value of a designated polarization pixel in a pixel block, which includes the designated polarization pixel with a polarization direction designated in advance from combinations of normal pixels different from the reference normal pixels and polarization pixels with polarization directions that allow to calculate an average intensity value, and a predicted value of a same polarization direction, and
the predicted value is calculated for each polarization direction based on a ratio indicating intensity values of the normal pixel different from the reference normal pixel and an intensity value of the designated polarization pixel in a pixel block adjacent to the pixel block.

11. The image processing apparatus according to claim 2, further comprising:
- a characteristic information storage unit configured to store characteristic information regarding acquisition of the polarized image including the polarization pixels with the plurality of polarization directions,
- wherein the information compression unit uses the characteristic information stored in the characteristic information storage unit to generate the compressed image information, and
- wherein the characteristic information storage unit is implemented via at least one non-transitory computer-readable storage medium.

12. The image processing apparatus according to claim 11,
- wherein the characteristic information indicates an extinction ratio of a polarization imaging unit configured to acquire the polarized image,
- wherein the information compression unit uses the extinction ratio to correct the polarized image and uses the polarized image after the correction to generate the compressed image information,
- wherein the extinction ratio indicates a ratio of intensity values before and after the polarization imaging unit acquires the polarized image, and
- wherein the polarization imaging unit is implemented via at least one imaging sensor.

13. The image processing apparatus according to claim 11, wherein
- the characteristic information indicates a polarization direction of polarization illumination light used to acquire the polarized image, and
- the information compression unit generates the reference image information and the difference information based on the polarization direction of the polarization illumination light.

14. The image processing apparatus according to claim 2, wherein
- the information compression unit sets a bit width of the difference information to a width smaller than a bit width of the reference image information to reduce the amount of information of the difference information.

15. An image processing method comprising:
- by at least one processor of an information compression unit, generating compressed image information by reducing an amount of information of polarized image information of each of polarization pixels with at least a plurality of polarization directions in a polarized image including polarization pixels with a plurality of polarization directions,
- wherein the amount of information of the polarized image information is reduced by encoding difference information indicating a difference between a reference intensity value of a reference polarization pixel for a respective color and an intensity value of at least one other polarization pixel of the respective color.

16. A non-transitory computer-readable storage medium having embodied thereon a program, which when executed by a computer causes the computer to execute a compression process of a polarized image, the compression process comprising:
- acquiring the polarized image including polarization pixels with a plurality of polarization directions; and
- generating compressed image information by reducing an amount of information of polarized image information of each of polarization pixels with at least a plurality of polarization directions in the polarized image,
- wherein the amount of information of the polarized image information is reduced by encoding difference information indicating a difference between a reference intensity value of a reference polarization pixel for a respective color and an intensity value of at least one other polarization pixel of the respective color.

17. An image processing apparatus comprising:
- an information decoding unit configured to generate a polarized image by executing a decoding process of compressed image information generated by an information compression unit reducing an amount of information of polarized image information of each of polarization pixels with at least a plurality of polarization directions in the polarized image including polarization pixels with a plurality of polarization directions,
- wherein the amount of information of the polarized image information is reduced by encoding difference information indicating a difference between a reference intensity value of a reference polarization pixel for a respective color and an intensity value of at least one other polarization pixel of the respective color, and
- wherein the information decoding unit and the information compression unit are each implemented via at least one processor.

18. The image processing apparatus according to claim 17, wherein
- the compressed image information includes reference image information and difference information with reduced amount of information, the compressed image information being obtained by setting the reference image information based on polarized image information of the reference polarization pixel in the polarized image, generating the difference information between polarized image information of each polarization pixel different from the reference polarization pixel in the polarized image and the reference image information, and reducing the amount of information of the difference information generated for each polarization pixel, and
- the information decoding unit generates an intensity value of each pixel of the polarized image based on the reference image information and the difference information.

* * * * *